(12) United States Patent
Yang et al.

(10) Patent No.: US 12,067,680 B2
(45) Date of Patent: Aug. 20, 2024

(54) SYSTEMS AND METHODS FOR MESH GENERATION

(71) Applicant: ADOBE INC., San Jose, CA (US)

(72) Inventors: Jimei Yang, Mountain View, CA (US); Chun-han Yao, Santa Clara, CA (US); Duygu Ceylan Aksit, London (GB); Yi Zhou, San Jose, CA (US)

(73) Assignee: ADOBE INC., San Jose, CA (US)

( * ) Notice: Subject to any disclaimer, the term of this patent is extended or adjusted under 35 U.S.C. 154(b) by 101 days.

(21) Appl. No.: 17/816,813

(22) Filed: Aug. 2, 2022

(65) Prior Publication Data

US 2024/0046566 A1 Feb. 8, 2024

(51) Int. Cl.
*G06T 17/20* (2006.01)

(52) U.S. Cl.
CPC .................... *G06T 17/20* (2013.01)

(58) Field of Classification Search
CPC ..... G06T 2207/30196; G06T 7/50–596; G06T 7/70–77; G06T 17/20; G06V 10/82; G06V 40/10; G06V 40/103
See application file for complete search history.

(56) References Cited

U.S. PATENT DOCUMENTS

| 2010/0197399 | A1* | 8/2010 | Geiss | G06T 7/251 |
| | | | | 463/32 |
| 2022/0319209 | A1* | 10/2022 | Wu | G06V 40/103 |
| 2023/0419730 | A1* | 12/2023 | Yerushalmy | G06V 40/10 |

OTHER PUBLICATIONS

Huang, Buzhen, Tianshu Zhang, and Yangang Wang. "Pose2UV: Single-Shot Multiperson Mesh Recovery With Deep UV Prior." IEEE Transactions on Image Processing 31 (2022): 4679-4692. (Year: 2022).*
1Alldieck, et al., "Tex2shape: Detailed Full Human Body Geometry From a Single Image", arXiv preprint arXiv: 1904.08645v2 [cs.CV] Sep. 15, 2019, 13 pages.
2Agarap, "Deep Learning using Rectified Linear Units (ReLU)", arXiv preprint arXiv:1803.08375v2 [cs.NE] Feb. 7, 2019, 7 pages.
3Andriluka, et al., "2D Human Pose Estimation: New Benchmark and State of the Art Analysis", In CVPR2014, available at https://openaccess.thecvf.com/content_cvpr_2014/papers/Andriluka_2D_Human_Pose_2014_CVPR_paper.pdf, 8 pages.
4Bogo, et al., "Keep it SMPL: Automatic Estimation of 3D Human Pose and Shape from Single Image", arXiv preprint arXiv:1607.08128v1 [cs.CV] Jul. 27, 2016, 18 pages.
5Choi, et al., "Pose2Mesh: Graph Convolutional Network for 3D Human Pose and Mesh Recovery from a 2D Human Pose", arXiv preprint arXiv:2008.09047v3 [cs.CV] Apr. 27, 2021, 27 pages.

(Continued)

*Primary Examiner* — Ryan McCulley
(74) *Attorney, Agent, or Firm* — F. CHAU & ASSOCIATES, LLC

(57) ABSTRACT

Systems and methods for mesh generation are described. One aspect of the systems and methods includes receiving an image depicting a visible portion of a body; generating an intermediate mesh representing the body based on the image; generating visibility features indicating whether parts of the body are visible based on the image; generating parameters for a morphable model of the body based on the intermediate mesh and the visibility features; and generating an output mesh representing the body based on the parameters for the morphable model, wherein the output mesh includes a non-visible portion of the body that is not depicted by the image.

20 Claims, 11 Drawing Sheets

(56) References Cited

OTHER PUBLICATIONS

6Deng, et al., "ImageNet: A Large-Scale Hierarchical Image Database", In 2009 IEEE Conference on Computer Vision and Pattern Recognition, Jun. 2009, available at https://ieeexplore.ieee.org/document/5206848.

7Gower, "Generalized procrustes analysis", in Psychometrika, vol. 40, No. 1, pp. 33-51, Mar. 1975, available at https://link.springer.com/article/10.1007/BF02291478.

8Güler, et al., "DensePose: Dense Human Pose Estimation in the Wild", arXiv preprint arXiv:1802.00434v1 [cs.CV] Feb. 1, 2018, 12 pages.

9Hassan, et al., "Resolving 3D Human Pose Ambiguities with 3D Scene Constraints", arXiv preprint arXiv:1908.06963v1 [cs.CV] Aug. 20, 2019, 18 pages.

10He, et al., "Mask R-CNN", arXiv preprint arXiv:1703.06870v3 [cs.CV] Jan. 24, 2018, 12 pages.

11He, et al., "Deep Residual Learning for Image Recognition", arXiv preprint arXiv:1512.03385v1 [cs.CV] Dec. 10, 2015, 12 pages.

12Ioffe and Szegedy, "Batch Normalization: Accelerating Deep Network Training by Reducing Internal Covariate Shift", arXiv preprint arXiv:1502.03167v3 [cs.LG] Mar. 2, 2015, 11 pages.

13Ionescu, et al., "Human3.6M: Large Scale Datasets and Predictive Methods for 3D Human Sensing in Natural Environments", in IEEE Transactions on Pattern Analysis and Machine Intelligence, 2014, pp. 1-15, 15 pages.

14Johnson and Everingham, "Learning effective human pose estimation from inaccurate annotation", in CVPR 2011, available at https://ieeexplore.ieee.org/document/5995318.

15Kanazawa, et al., "End-to-end Recovery of Human Shape and Pose", arXiv preprint arXiv:1712.06584v2 [cs.CV] Jun. 23, 2018, 10 pages.

16Kingma and Ba, "Adam: A Method for Stochastic Optimization", arXiv preprint arXiv:1412.6980v9 [cs.LG] Jan. 30, 2017, 15 pages.

17Kocabas, et al., "VIBE: Video Inference for Human Body Pose and Shape Estimation", arXiv preprint arXiv:1912.05656v3 [cs.CV] Apr. 29, 2020, 12 pages.

18Kocabas, et al., "PARE: Part Attention Regressor for 3D Human Body Estimation", arXiv preprint rXiv:2104.08527v2 [cs.CV] Oct. 11, 2021, 21 pages.

19Kolotouros, et al., "Learning to Reconstruct 3D Human Pose and Shape via Model-fitting in the Loop", arXiv preprint arXiv:1909.12828v1 [cs.CV] Sep. 27, 2019, 10 pages.

20Kolotouros, et al., "Convolutional Mesh Regression for Single-Image Human Shape Reconstruction", arXiv preprint arXiv:1905.03244v1 [cs.CV] May 8, 2019, 10 pages.

21Kolotouros, et al., "Probabilistic Modeling for Human Mesh Recovery", arXiv preprint arXiv:2108.11944v1 [cs.CV] Aug. 26, 2021, 10 pages.

22Lassner, et al., "Unite the People: Closing the Loop Between 3D and 2D Human Representations", arXiv preprint arXiv:1701.02468v3 [cs.CV] Jul. 25, 2017, 10 pages.

23Lin, et al., "End-to-End Human Pose and Mesh Reconstruction with Transformers", arXiv preprint arXiv:2012.09760v3 [cs.CV] Jun. 15, 2021, 17 pages.

24Lin, et al., "Mesh Graphormer", arXiv preprint arXiv:2104.00272v2 [cs.CV] Aug. 15, 2021, 15 pages.

25Lin, et al., "Microsoft COCO: Common Objects in Context", arXiv preprint rXiv:1405.0312v3 [cs.CV] Feb. 21, 2015, 15 pages.

26Loper, et al., "SMPL: A Skinned Multi-Person Linear Model", in ACM Transactions on Graphics, vol. 34, No. 6, Article 248, pp. 1-16, Nov. 2015, 16 pages.

27Mehta, et al., "Monocular 3D Human Pose Estimation in the Wild Using Improved CNN Supervision", arXiv preprint arXiv:1611.09813v5 [cs.CV] Oct. 4, 2017, 16 pages.

28Mehta, et al., "Single-Shot Multi-Person 3D Pose Estimation from Monocular RGB", arXiv preprint arXiv:1712.03453v3 [cs.CV] Aug. 28, 2018, 16 pages.

29Moon, et al., "V2V-PoseNet: Voxel-to-Voxel Prediction Network for Accurate 3D Hand and Human Pose Estimation from a Single Depth Map", arXiv preprint arXiv:1711.07399v3 [cs.CV] Aug. 16, 2018, 14 pages.

30Moon, et al., "Camera Distance-aware Top-down Approach for 3D Multi-person Pose Estimation from a Single RGB Image", arXiv preprint arXiv:1907.11346v2 [cs.CV] Aug. 17, 2019, 15 pages.

31Moon and Lee, "I2L-MeshNet: Image- to-Lixel Prediction Network for Accurate 3D Human Pose and Mesh Estimation from a Single RGB Image", arXiv preprint arXiv:2008.03713v2 [cs.CV] Nov. 1, 2020, 23 pages.

32Muller, et al., "On Self-Contact and Human Pose", arXiv preprint arXiv:2104.03176v2 [cs.CV] Apr. 8, 2021, 18 pages.

33Omran, et al., "Neural Body Fitting: Unifying Deep Learning and Model Based Human Pose and Shape Estimation", arXiv preprint arXiv:1808.05942v1 [cs.CV] Aug. 17, 2018, 13 pages.

34Paszke, et al., "PyTorch: An Imperative Style, High-Performance Deep Learning Library", arXiv preprint arXiv:1912.01703v1 [cs.LG] Dec. 3, 2019, 12 pages.

35Pavlakos, et al., "Expressive Body Capture: 3D Hands, Face, and Body from a Single Image", arXiv preprint arXiv:1904.05866v1 [cs.CV] Apr. 11, 2019, 22 pages.

36Pavlakos, et al., "TexturePose: Supervising Human Mesh Estimation with Texture Consistency", arXiv preprint arXiv:1910.11322v1 [cs.CV] Oct. 24, 2019, 10 pages.

37Pavlakos, et al., "Learning to Estimate 3D Human Pose and Shape from a Single Color Image", arXiv preprint arXiv:1805.04092v1 [cs.CV] May 10, 2018, 10 pages.

38Rockwell and Fouhey, "Full-Body Awareness from Partial Observations", arXiv preprint arXiv:2008.06046v1 [cs.CV] Aug. 13, 2020, 29 pages.

39Saito, et al., "PIFu: Pixel-Aligned Implicit Function for High-Resolution Clothed Human Digitization", arXiv preprint arXiv:1905.05172v3 [cs.CV] Dec. 3, 2019, 15 pages.

40Saito, et al., "PIFuHD: Multi-Level Pixel-Aligned Implicit Function for High-Resolution 3D Human Digitization", arXiv preprint arXiv:2004.00452v1 [cs.CV] Apr. 1, 2020, 10 pages.

41Sun, et al., "Integral Human Pose Regression", arXiv preprint arXiv:1711.08229v4 [cs.CV] Sep. 18, 2018, 17 pages.

42Sun, et al., "Monocular, One-stage, Regression of Multiple 3D People", arXiv preprint arXiv:2008.12272v4 [cs.CV] Sep. 16, 2021, 17 pages.

43Varol, et al., "BodyNet: Volumetric Inference of 3D Human Body Shapes", arXiv preprint arXiv:1804.04875v3 [cs.CV] Aug. 18, 2018, 27 pages.

44Vaswani, et al., "Attention Is All You Need", arXiv preprint arXiv:1706.03762v5 [cs.CL] Dec. 6, 2017, 15 pages.

45Von Marcard, et al., "Recovering Accurate 3D Human Pose in The Wild Using IMUs and a Moving Camera", in ECCV 2018, available at https://openaccess.thecvf.com/content_ECCV_2018/papers/Timo_von_Marcard_Recovering_Accurate_3D_ECCV_2018_paper.pdf, 17 pages.

46Xu, et al., "DenseRaC: Joint 3D Pose and Shape Estimation by Dense Render-and-Compare", arXiv preprint arXiv:1910.00116v2 [cs.CV] Oct. 9, 2019, 11 pages.

47Zeng, et al., "3D Human Mesh Regression with Dense Correspondence", arXiv preprint arXiv:2006.05734v2 [cs.CV] Jun. 6, 2021, 15 pages.

48Zhang, et al., "Object-Occluded Human Shape and Pose Estimation from a Single Color Image", in CVPR 2020, available at https://openaccess.thecvf.com/content_CVPR_2020/papers/Zhang_Object-Occluded_Human_Shape_and_Pose_Estimation_From_a_Single_Color_CVPR_2020_paper.pdf, 10 pages.

49Zhou, et al., "MonoCap: Monocular Human Motion Capture using a CNN Coupled with a Geometric Prior", arXiv preprint arXiv:1701.02354v2 [cs.CV] Mar. 9, 2018, 14 pages.

* cited by examiner

SYSTEMS AND METHODS FOR MESH GENERATION

BACKGROUND

The following relates generally to three-dimensional modeling, and more specifically to mesh generation. Three-dimensional modeling refers to a computer graphics process of generating a three-dimensional rendering of geometric data. Examples of uses for three-dimensional models are computer animation and video gaming. Meshes are a collection of vertices, edges, and faces that provide the shape of an object, such that a three-dimensional model of an object can be rendered based on a mesh of the object.

Estimating three-dimensional pose and shape data for meshes of bodies depicted in an image is an important task for various three-dimensional modeling applications, such as performance retargeting, human action recognition, and generation of virtual avatars. In some cases, an image depicts only a portion of a body. However, in some cases, parts of the body being modeled are hidden or obscured in the original image. There is therefore a need in the art for mesh generation systems and methods that generate an accurate mesh based on partial-body images.

SUMMARY

Embodiments of the present disclosure provide mesh generation systems and methods that use a machine learning model to obtain visibility features that indicate whether a part of a body is visible in an image and to generate a mesh for the body based on the visibility features. By generating the visibility features, the machine learning model is able to identify and ignore parts of the body that are not visible in the image when generating the mesh for the body, thereby producing a mesh that includes more accurate predictions of vertices and joints for the body than conventional mesh generation techniques.

A method, apparatus, non-transitory computer readable medium, and system for mesh generation are described. One or more aspects of the method, apparatus, non-transitory computer readable medium, and system include receiving an image depicting a visible portion of a body; generating an intermediate mesh representing the body based on the image; generating visibility features indicating whether parts of the body are visible based on the image; generating parameters for a morphable model of the body based on the intermediate mesh and the visibility features; and generating an output mesh representing the body based on the parameters for the morphable model, wherein the output mesh includes a non-visible portion of the body that is not depicted by the image.

A method, apparatus, non-transitory computer readable medium, and system for mesh generation are described. One or more aspects of the method, apparatus, non-transitory computer readable medium, and system include receiving training data including an image of a body, a training mesh representing the body, and training visibility features; generating an intermediate mesh representing the body and visibility features indicating whether parts of the body are visible using a mesh generation network; and computing a vertex loss by comparing the coordinates of the plurality of vertices of the intermediate mesh and coordinates of vertices of the training mesh, wherein the parameters of the mesh generation network are updated based on the vertex loss.

An apparatus and system for mesh generation are described. One or more aspects of the apparatus and system include a mesh generation network configured to generate an intermediate mesh representing a body depicted in an image and visibility features indicating whether parts of the body are visible; a regression network configured to generate parameters for a morphable model of the body based on the intermediate mesh and the visibility features; and a skinning component configured to generate an output mesh representing the body by applying the morphable model based on the parameters.

DETAILED DESCRIPTION

Figure 1:
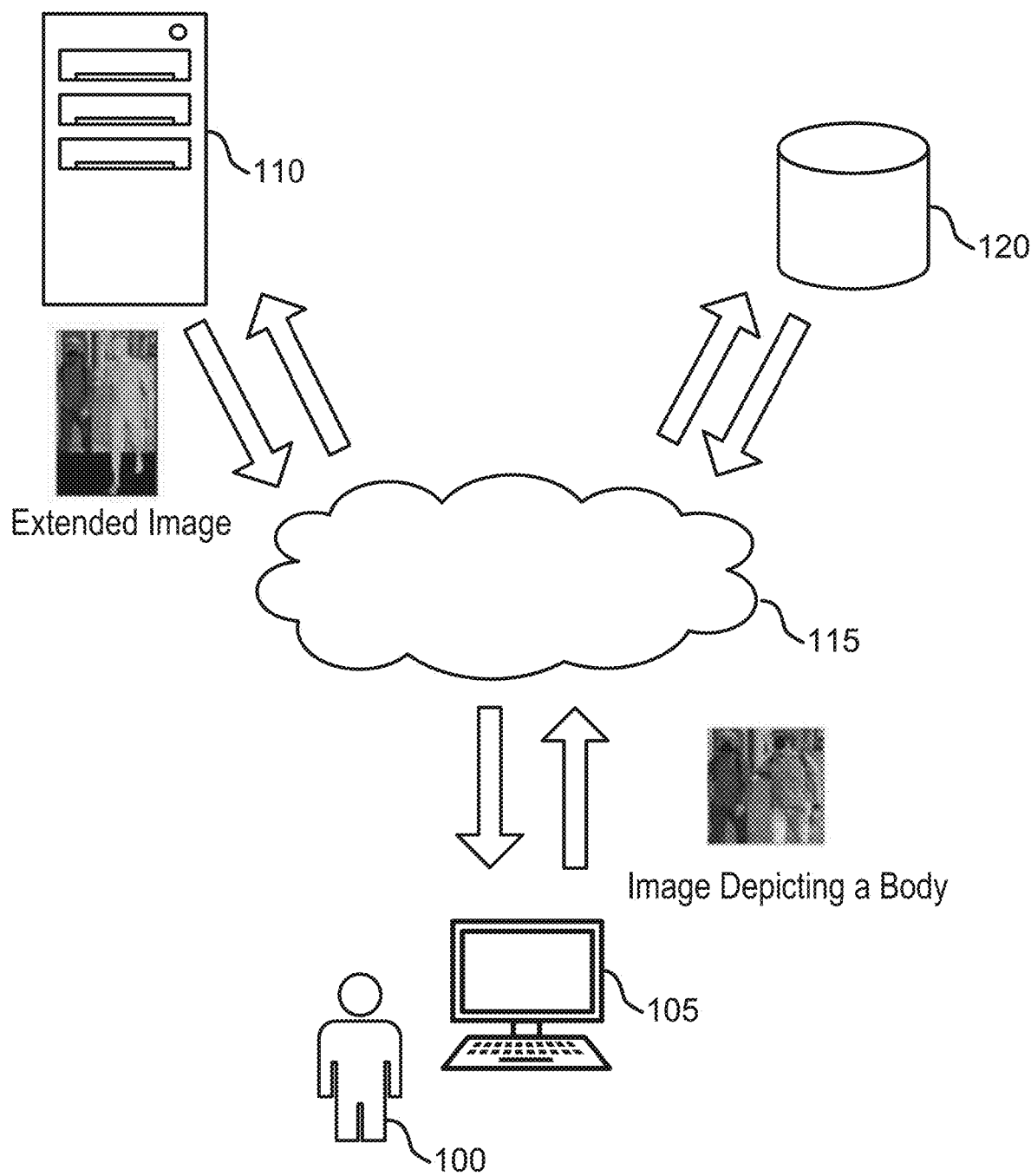
FIG. 1 shows an example of a mesh generation system according to aspects of the present disclosure.

The present disclosure relates generally to three-dimensional modeling, and more specifically to mesh generation. Three-dimensional modeling refers to a computer graphics process of generating a three-dimensional rendering of geometric data. Three-dimensional models are used, for example, in computer animation and gaming. Meshes are a collection of vertices, edges, and faces that provide the shape of an object, such that a three-dimensional model of an object can be rendered based on a mesh of the object.

Estimating three-dimensional pose and shape data for meshes of bodies depicted in an image is an important task for various three-dimensional modeling applications, such as performance retargeting, human action recognition, and generation of virtual avatars. In some cases, an image depicts only a portion of a body. However, without knowing which joints/vertices of a mesh correspond to parts of the body that are visible in the image, conventional mesh generation techniques produce erroneous outputs.

According to some embodiments of the present disclosure, a system receives an image depicting a visible portion of a body and uses a machine learning model to generate an intermediate mesh representing the body based on the image, generate visibility features indicating whether parts of the body are visible based on the image, generate parameters for a morphable model of the body based on the intermediate mesh and the visibility features, and generate an output mesh representing the body based on the parameters for the morphable model. In some embodiments, the output mesh includes a non-visible portion of the body that is not depicted by the image. By generating the visibility features, the machine learning model is able to identify which portions of the body are visible in the image, thereby increasing an accuracy of the output mesh. For example, using the visibility features, the machine learning model is able to identify and ignore parts of the body that are not visible in the image when generating the mesh for the body, thereby producing a mesh that includes more accurate predictions of vertices and joints for the body than conventional mesh generation techniques. Furthermore, by generating parameters for a morphable model based on the visibility features and generating the output mesh based on the morphable model, the system further increases the accuracy of the output mesh.

An embodiment of the present disclosure is used in an image rendering context. In an example, a user provides an image depicting a body to the system, the system generates an accurate mesh for the body based on visibility features, and renders an extended image of the body (e.g., a three-dimensional model of the body) using the accurate mesh. The body is a multi-dimensional structure that is capable of being represented by a deformable model. In some embodiments, the body is a human body. Example applications of the present disclosure in the image rendering context are provided with reference to FIGS. 1 and 6. Details regarding the architecture of the system are provided with reference to FIGS. 1-5. Examples of a process for mesh generation are provided with reference to FIGS. 6-9. Examples of a process for training the machine learning model are provided with reference to FIGS. 10-11.

Mesh Generation System

A system and apparatus for mesh generation is described with reference to FIGS. 1-5. One or more aspects of the system and apparatus include a mesh generation network configured to generate an intermediate mesh representing a body depicted in an image and visibility features indicating whether parts of the body are visible; a regression network configured to generate parameters for a morphable model of the body based on the intermediate mesh and the visibility features; and a skinning component configured to generate an output mesh representing the body by applying the morphable model based on the parameters.

Some examples of the system and apparatus further include a UV component configured to generate a dense UV map of a body, where the regression network is trained based on the dense UV map.

FIG. 1 shows an example of a mesh generation system according to aspects of the present disclosure. The example shown includes user 100, user device 105, mesh generation apparatus 110, cloud 115, and database 120. Mesh generation apparatus 110 is an example of, or includes aspects of, the corresponding element described with reference to FIG. 2.

Referring to FIG. 1, in an example, user 100 provides an image depicting a body to mesh generation apparatus 110 via a graphical user interface displayed by mesh generation apparatus 110 on user device 105. In some embodiments, the body is a three-dimensional structure that is capable of being represented by a deformable model. In some embodiments, the body is a human body. Mesh generation apparatus 110 generates an extended image (such as a three-dimensional model) of the body. In some embodiments, the extended image is rendered based on an output mesh that is generated based on visibility features computed by a machine learning model of mesh generation apparatus 110 as described with reference to FIG. 2. In some embodiments, a visibility feature is a concatenation of two or more labels that indicate whether a machine learning model of mesh generation apparatus 110 thinks a portion of the body is truncated or occluded in the image. By generating the output mesh based on the visibility features, the extended image accurately depicts portions of the body that are not included in the image, whether by truncation from image boundaries or by occlusion from other objects or portions of the body depicted in the image. As shown in FIG. 1, the extended image is depicted as a two-dimensional representation of a three-dimensional model that is overlaid on the image.

According to some aspects, user device 105 is a personal computer, laptop computer, mainframe computer, palmtop computer, personal assistant, mobile device, or any other suitable processing apparatus. In some examples, user device 105 includes software that displays a graphical user interface provided by mesh generation apparatus 110. In some aspects, the graphical user interface allows user 100 to upload or otherwise transfer a file including the image to mesh generation apparatus 110. In some aspects, the graphical user interface displays the extended image to user 100.

According to some aspects, a user interface enables user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, the user interface may be a graphical user interface (GUI).

According to some aspects, mesh generation apparatus 110 includes a computer implemented network. In some embodiments, the computer implemented network includes a machine learning model. In some embodiments, mesh generation apparatus 110 also includes one or more processors, a memory subsystem, a communication interface, an I/O interface, one or more user interface components, and a bus. Additionally, in some embodiments, mesh generation apparatus 110 communicates with user device 105 and database 120 via cloud 115.

In some cases, mesh generation apparatus 110 is implemented on a server. A server provides one or more functions to users linked by way of one or more of various networks, such as cloud 115. In some cases, the server includes a single microprocessor board, which includes a microprocessor responsible for controlling all aspects of the server. In some cases, the server uses microprocessor and protocols to exchange data with other devices or users on one or more of the networks via hypertext transfer protocol (HTTP), and simple mail transfer protocol (SMTP), although other protocols such as file transfer protocol (FTP), and simple network management protocol (SNMP) may also be used. In some cases, the server is configured to send and receive hypertext markup language (HTML) formatted files (e.g., for displaying web pages). In various embodiments, the server comprises a general purpose computing device, a personal computer, a laptop computer, a mainframe computer, a supercomputer, or any other suitable processing apparatus. Mesh generation apparatus 110 is an example of, or includes aspects of, the corresponding element described with reference to FIG. 2.

Further detail regarding the architecture of mesh generation apparatus 110 is provided with reference to FIGS. 2-5. Further detail regarding a process for mesh generation is provided with reference to FIGS. 6-9. Further detail regarding a process for training the machine learning model is provided with reference to FIGS. 10-11.

Cloud 115 is a computer network configured to provide on-demand availability of computer system resources, such as data storage and computing power. In some examples, cloud 115 provides resources without active management by user 100. The term "cloud" is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location. According to some aspects, cloud 115 provides communications between user device 105, mesh generation apparatus 110, and database 120.

Database 120 is an organized collection of data. In an example, database 120 stores data in a specified format known as a schema. According to some aspects, database 120 is structured as a single database, a distributed database, multiple distributed databases, or an emergency backup database. In some cases, a database controller manages data storage and processing in database 120. In some cases, user 100 interacts with the database controller. In other cases, the database controller operates automatically without user interaction. According to some aspects, database 120 stores the various outputs generated by components of mesh generation apparatus 110, including an intermediate mesh, joint coordinates corresponding to the intermediate mesh, a morphable model, an output mesh, and an extended image. In some aspects, mesh generation apparatus 110 retrieves the image from database 120. In some aspects, mesh generation apparatus 110 retrieves training data and additional training data from database 120. In some aspects, database 120 is external to mesh generation apparatus 110 and communicates with mesh generation apparatus 110 via cloud 115. In some embodiments, database 120 is included in mesh generation apparatus 110.

Figure 2:
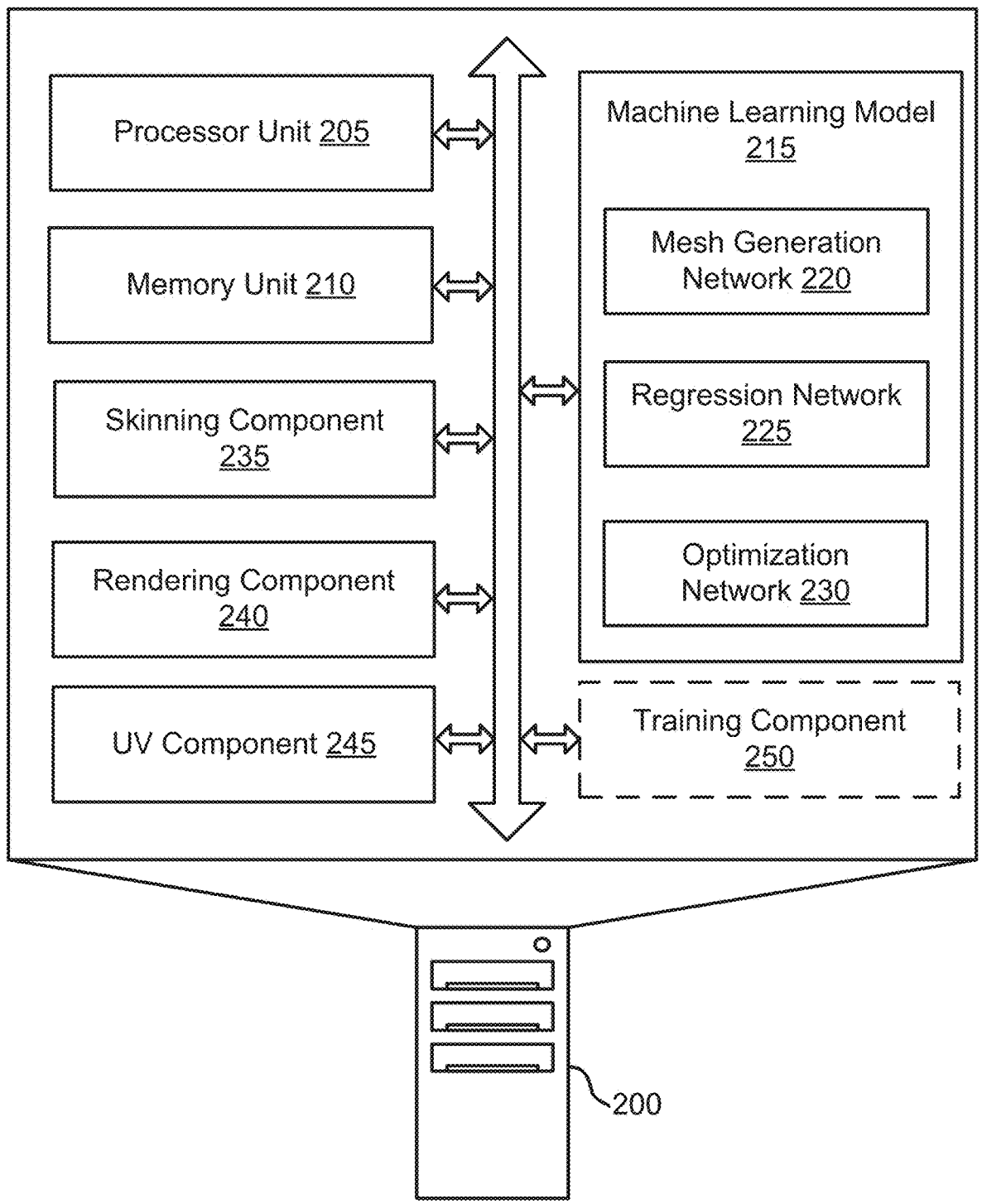
FIG. 2 shows an example of a mesh generation apparatus according to aspects of the present disclosure.

FIG. 2 shows an example of a mesh generation apparatus according to aspects of the present disclosure. Mesh generation apparatus 200 is an example of, or includes aspects of, the corresponding element described with reference to FIG. 1. In one aspect, mesh generation apparatus 200 includes processor unit 205, memory unit 210, machine learning model 215, skinning component 235, rendering component 240, UV component 245, and training component 250.

Processor unit 205 includes one or more processors. A processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof. In some cases, processor unit 205 is configured to operate a memory array using a memory controller. In other cases, a memory controller is integrated into processor unit 205. In some cases, processor unit 205 is configured to execute computer-readable instructions stored in memory unit 210 to perform various functions. In some embodiments, processor unit 205 includes special purpose components for modem processing, baseband processing, digital signal processing, or transmission processing.

Memory unit 210 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor of processor unit 205 to perform various functions described herein. In some cases, memory unit 210 includes a basic input/output system (BIOS) that controls basic hardware or software operations, such as an interaction with peripheral components or devices. In some cases, memory unit 210 includes a memory controller that operates memory cells of memory unit 210. For example, the memory controller may include a row decoder, column decoder, or both. In some cases, memory cells within memory unit 210 store information in the form of a logical state.

According to some aspects, machine learning model 215 includes one or more artificial neural networks (ANNs). An ANN is a hardware or a software component that includes a number of connected nodes (i.e., artificial neurons) that loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge are associated with one or more node weights that determine how the signal is processed and transmitted.

In ANNs, a hidden (or intermediate) layer includes hidden nodes and is located between an input layer and an output layer. Hidden layers perform nonlinear transformations of inputs entered into the network. Each hidden layer is trained to produce a defined output that contributes to a joint output of the output layer of the neural network. Hidden representations are machine-readable data representations of an input that are learned from a neural network's hidden layers and are produced by the output layer. As the neural network's understanding of the input improves as it is trained, the hidden representation is progressively differentiated from earlier iterations.

During a training process of an ANN, the node weights are adjusted to improve the accuracy of the result (i.e., by minimizing a loss which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some aspects, machine learning model 215 is implemented as one or more hardware circuits, as firmware, as software stored in memory unit 210 and executed by processor unit 205, or as a combination thereof. In one aspect, machine learning model 215 includes mesh generation network 220, regression network 225, and optimization network 230. According to some aspects, each of mesh generation network 220, regression network 225, and optimization network 230 includes one or more ANNs.

According to some aspects, mesh generation network 220 receives an image depicting a visible portion of a body. In some examples, mesh generation network 220 generates an intermediate mesh representing the body based on the image. In some examples, mesh generation network 220 generates visibility features indicating whether parts of the body are visible based on the image.

In some examples, mesh generation network 220 extracts image features from the image, where the intermediate mesh and the visibility features are based on the image features. In some examples, mesh generation network 220 identifies a set of vertices of the intermediate mesh. In some examples, mesh generation network 220 identifies a set of joints corresponding to the intermediate mesh. In some examples, mesh generation network 220 generates a set of vertex heatmaps for each of the set of vertices.

In some examples, mesh generation network 220 generates a set of joint heatmaps for each of the set of joints. In some examples, mesh generation network 220 applies an activation function to the set of vertex heatmaps to obtain vertex coordinates for each of the set of vertices, where the intermediate mesh includes the vertex coordinates. In some examples, mesh generation network 220 applies an activation function to the set of joint heatmaps to obtain joint coordinates for each of the set of joints.

In some examples, mesh generation network 220 generates truncation data and occlusion data for the parts of the body based on the image, where the visibility features are based on the truncation data and the occlusion data.

According to some aspects, mesh generation network 220 generates an intermediate mesh representing the body and visibility features indicating whether parts of the body are visible using a mesh generation network 220. In some examples, mesh generation network 220 generates coordinates for a set of vertices of the intermediate mesh using the mesh generation network 220. In some examples, mesh generation network 220 generates coordinates for a set of joints corresponding to the intermediate mesh using the mesh generation network 220.

According to some aspects, mesh generation network 220 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some aspects, mesh generation network 220 is configured to generate an intermediate mesh representing a body depicted in an image and visibility features indicating whether parts of the body are visible. According to some aspects, mesh generation network 220 is implemented as one or more hardware circuits, as firmware, as software stored in memory unit 210 and executed by processor unit 205, or as a combination thereof.

According to some aspects, regression network 225 generates parameters for a morphable model of the body based on the intermediate mesh and the visibility features. According to some aspects, regression network 225 predicts parameters for the morphable model using a regression network 225. According to some aspects, regression network 225 generates the morphable model based on the joint coordinates. In some aspects, the morphable model includes pose parameters and shape parameters. In some aspects, the morphable model includes a body template, joint locations, pose parameters, and blend weights. In some aspects, the morphable model includes a skinning function for generating the output mesh based on the parameters.

According to some aspects, regression network 225 includes a fully connected neural network. A fully connected neural network includes one or more fully connected layers. A fully connected layer is a function in which each output dimension depends on each input dimension.

According to some aspects, regression network 225 is configured to generate parameters for a morphable model of the body based on the intermediate mesh and the visibility features. According to some aspects, regression network 225 is implemented as one or more hardware circuits, as firmware, as software stored in memory unit 210 and executed by processor unit 205, or as a combination thereof.

According to some aspects, optimization network 230 identifies a visible portion of the intermediate mesh. In some examples, optimization network 230 identifies a portion of the output mesh corresponding to the visible portion of the intermediate mesh. In some examples, optimization network 230 optimizes the morphable model by comparing the visible portion of the intermediate mesh to the corresponding portion of the output mesh. According to some aspects, optimization network 230 is implemented as one or more hardware circuits, as firmware, as software stored in memory unit 210 and executed by processor unit 205, or as a combination thereof.

According to some aspects, skinning component 235 generates an output mesh representing the body based on the parameters for the morphable model, where the output mesh includes a non-visible portion of the body that is not depicted by the image.

According to some aspects, skinning component 235 is configured to generate an output mesh representing the body by applying the morphable model based on the parameters. According to some aspects, skinning component 235 is implemented as one or more hardware circuits, as firmware, as software stored in memory unit 210 and executed by processor unit 205, or as a combination thereof.

According to some aspects, rendering component 240 displays an extended portion of the body that is not visible in the image based on the output mesh. In some examples, rendering component 240 renders an extended image depicting a portion of the body that is not depicted in the image based on the output mesh. According to some aspects, rendering component 240 is implemented as one or more hardware circuits, as firmware, as software stored in memory unit 210 and executed by processor unit 205, or as a combination thereof.

According to some aspects, UV component 245 is configured to generate a dense UV map of a body, where the regression network 225 is trained based on the dense UV map. According to some aspects, UV component 245 is implemented as one or more hardware circuits, as firmware, as software stored in memory unit 210 and executed by processor unit 205, or as a combination thereof.

According to some aspects, training component 250 receives training data including an image of a body, a training mesh representing the body, and training visibility features. In some examples, training component 250 updates parameters of mesh generation network 220 based on the training mesh, the intermediate mesh, the visibility features, and the training visibility features.

In some examples, training component 250 computes a vertex loss by comparing the coordinates of the set of vertices of the intermediate mesh and coordinates of vertices of the training mesh, where the parameters of the mesh generation network 220 are updated based on the vertex loss. In some examples, training component 250 computes a joint loss by comparing the coordinates of the set of joints corresponding to the intermediate mesh and coordinates of a set of joints corresponding to the training mesh, where the parameters of the mesh generation network 220 are updated based on the joint loss.

In some examples, training component 250 computes a visibility loss by comparing the visibility features and the training visibility features, where the parameters of the mesh generation network 220 are updated based on the visibility loss. In some examples, training component 250 computes a UV correspondence loss based on the UV map and the visibility features, where mesh generation network 220 is updated based on the UV correspondence loss.

According to some aspects, training component 250 receives additional training data including an additional training mesh, additional training visibility features, and training parameters of a morphable model. In some examples, training component 250 updates parameters of regression network 225 based on the predicted parameters and the training parameters.

In some examples, training component 250 computes a difference between the output mesh and the additional training mesh. In some examples, training component 250 weights the difference based on the visibility features. In some examples, training component 250 computes a weighted vertex loss based on the weighted difference, where regression network 225 is updated based on the weighted vertex loss.

According to some aspects, training component 250 is implemented as one or more hardware circuits, as firmware, as software, or as a combination thereof. According to some aspects, training component 250 is omitted from mesh generation apparatus 200 and is included in a different device, where the different device uses training component 250 to train update parameters of machine learning model 215 as described herein, such as with reference to FIGS. 10 and 11.

Figure 3:
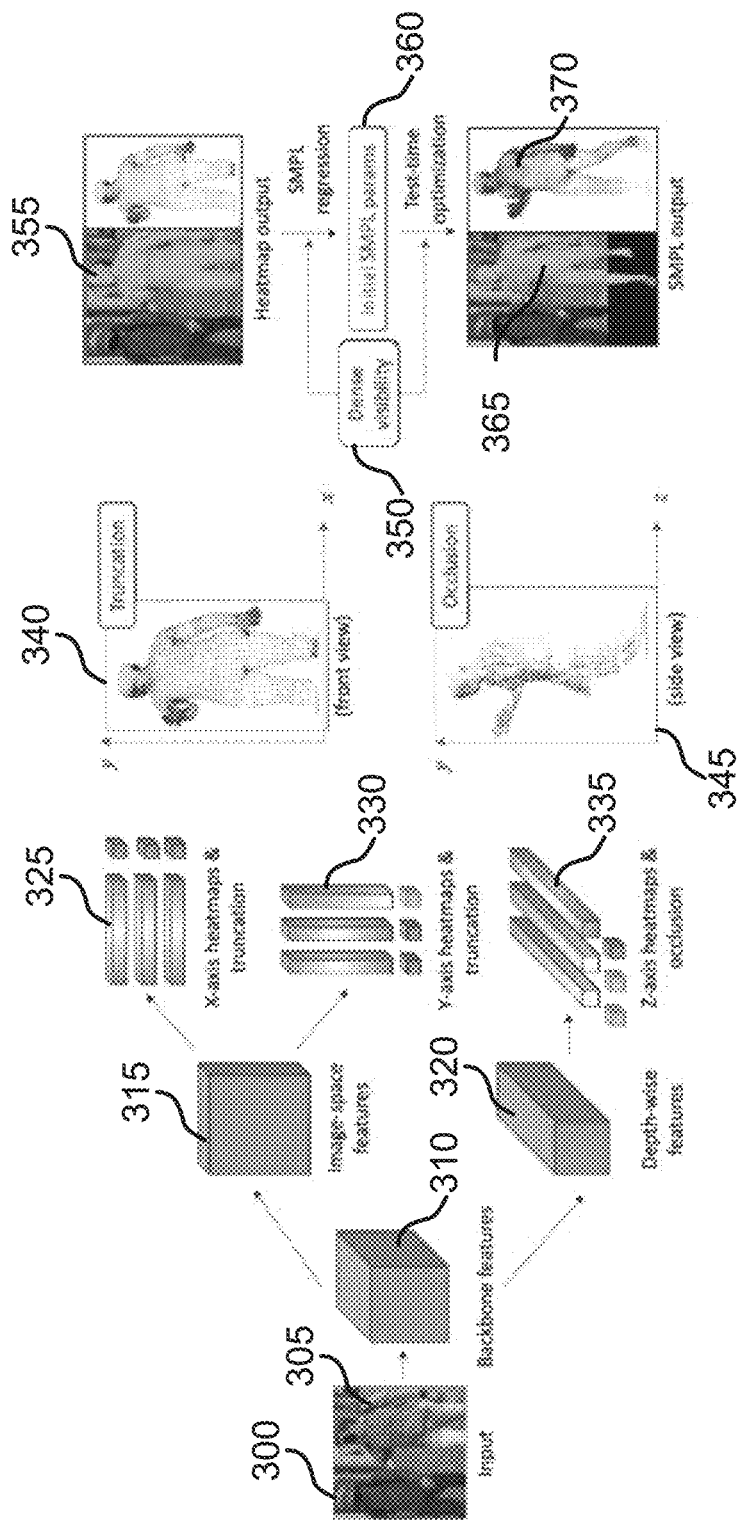
FIG. 3 shows an example of data flow in a machine learning model according to aspects of the present disclosure.

FIG. 3 shows an example of data flow in a machine learning model according to aspects of the present disclosure. The example shown includes image 300, backbone features 310, image-space features 315, depth-wise features 320, X-axis heatmaps and truncation data 325, Y-axis heatmaps and truncation data 330, Z-axis heatmaps and occlusion data 335, front visualization of mesh generation network output 340, side visualization of mesh generation network output 345, visibility features 350, first extended image 355, morphable model 360, second extended image 365, and visual representation of output mesh 370. In one aspect, image 300 includes body 305.

Referring to FIG. 3, in an example, a mesh generation network as described with reference to FIGS. 2 and 4 receives image 300 as input. A backbone network of the mesh generation network as described with reference to FIG. 4 extracts backbone features 310 (e.g., image features) including image-space features 315 and depth-wise features 320 relating to body 305 from image 300. The mesh generation network generates X-axis heatmaps and truncation data 325 and Y-axis heatmaps and truncation data 330 based on image-space features 315, and generates Z-axis heatmaps and occlusion data 335 based on depth-wise features 320, as described with reference to FIG. 7.

Front visualization of mesh generation network output 340 and side visualization of mesh generation network output 345 are visual representations of mesh generation network output described with reference to FIG. 7, including an intermediate mesh and visibility features 350, corresponding to body 305. First extended image 355 is a three-dimensional model rendering of body 305 based on the output of the mesh generation network and depicted as a two-dimensional image overlaid on image 300. The output of the mesh generation network is used by a regression network as described with reference to FIGS. 2 and 5 to generate morphable model 360 as described with reference to FIG. 7. In some embodiments, morphable model 360 includes initial parameters for a skinned multi-person linear (SMPL) model.

An optimization network as described with reference to FIG. 2 optimizes morphable model 360 as described with reference to FIG. 8. A rendering component as described with reference to FIG. 2 renders second extended image 365, including portions of body 305 that are not depicted in image 300, based on an output mesh generated using the optimized morphable model. Visual representation of output mesh 370 represents the output mesh generated by the regression network.

Figure 4:
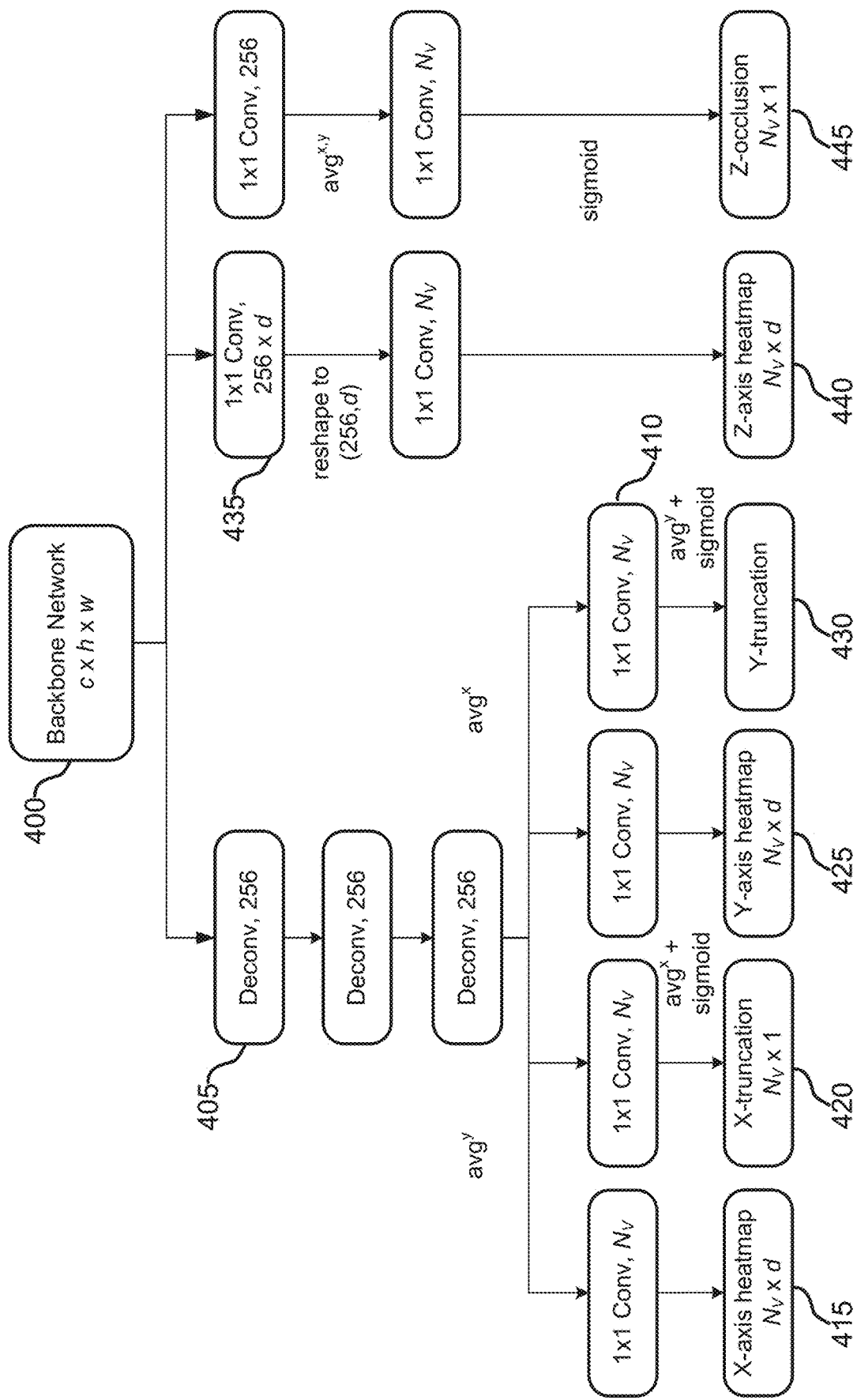
FIG. 4 shows an example of a mesh generation network according to aspects of the present disclosure.

FIG. 4 shows an example of a mesh generation network according to aspects of the present disclosure. The example shown includes backbone network 400, deconvolution layers 405, first convolutional layers 410, X-axis heatmap 415, X-truncation data 420, Y-axis heatmap 425, Y-truncation data 430, second convolutional layers 435, Z-axis heatmap 440, and Z-occlusion data 445.

According to some aspects, a mesh generation network as described with reference to FIG. 2 includes backbone network 400. In some embodiments, the backbone network is a feature extractor ANN that extracts image features from an input image. In some embodiments, the image features include information about objects depicted in the input image that the feature extraction network detects and isolates. In some embodiments, the mesh generation network performs classification tasks based on the image features using deconvolution layers 405, first convolutional layers 410, and second convolutional layers 435 of the mesh generation network to respectively obtain X-axis heatmap 415, X-truncation data 420, Y-axis heatmap 425, Y-truncation data 430, Z-axis heatmap 440, and Z-occlusion data 445 as described with reference to FIG. 7.

Figure 5:
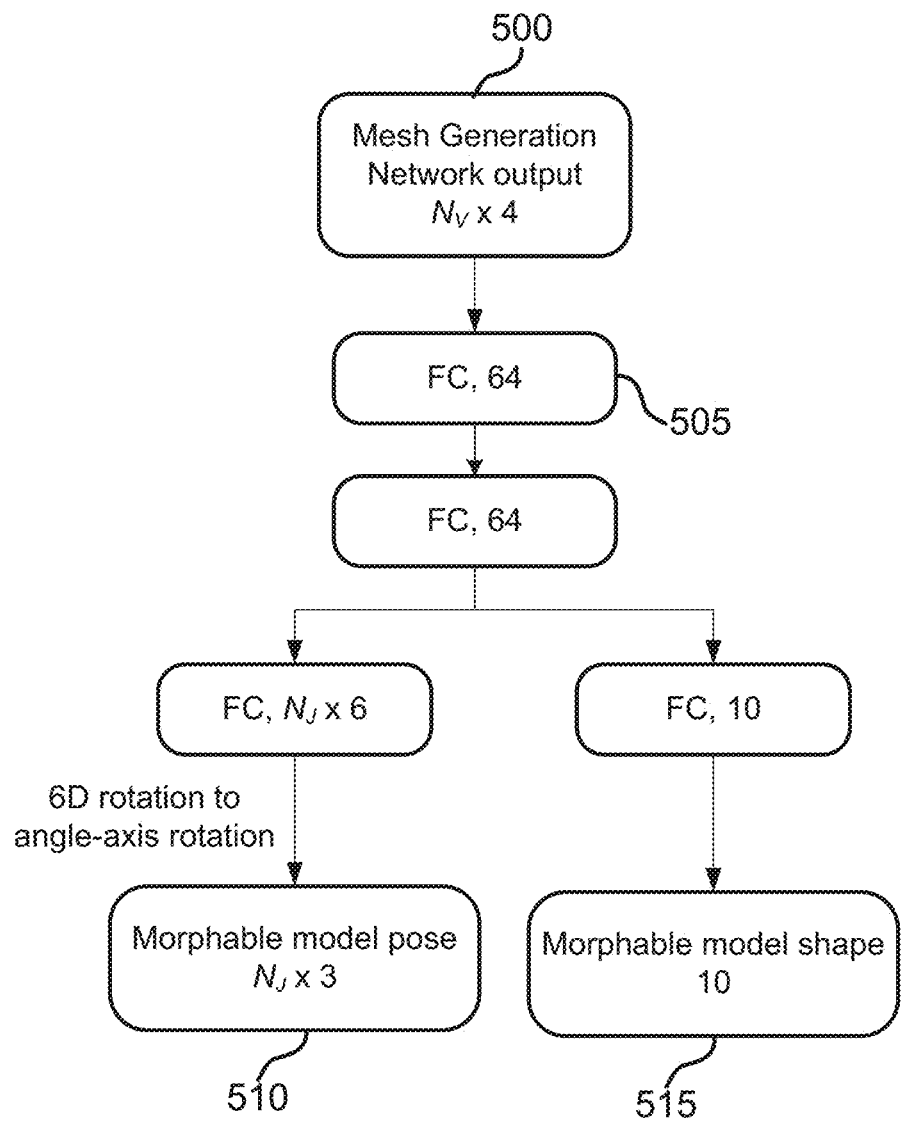
FIG. 5 shows an example of a regression network according to aspects of the present disclosure.

FIG. 5 shows an example of a regression network according to aspects of the present disclosure. The example shown includes mesh generation network output 500, fully connected layers 505, morphable model pose parameters 510, and morphable model shape parameters 515.

According to some aspects, a regression network includes fully connected layers 505 and uses fully connected layers 505 to regress morphable model pose parameters 510 and morphable model shape parameters 515 from mesh generation network output 500 as described with reference to FIG. 7.

Mesh Generation

A method for mesh generation is described with reference to FIGS. 6-9. One or more aspects of the method include receiving an image depicting a visible portion of a body; generating an intermediate mesh representing the body based on the image; generating visibility features indicating whether parts of the body are visible based on the image; generating parameters for a morphable model of the body based on the intermediate mesh and the visibility features; and generating an output mesh representing the body based on the parameters for the morphable model, wherein the output mesh includes a non-visible portion of the body that is not depicted by the image.

Some examples of the method further include displaying an extended portion of the body that is not visible in the image based on the output mesh. Some examples of the method further include performing a convolution operation on the image to obtain image features, wherein the intermediate mesh and the visibility features are based on the image features.

Some examples of the method further include identifying a plurality of vertices of the intermediate mesh. Some examples further include generating a plurality of vertex heatmaps for each of the plurality of vertices. Some examples further include applying an activation function to the plurality of vertex heatmaps to obtain vertex coordinates for each of the plurality of vertices, wherein the intermediate mesh includes the vertex coordinates.

Some examples of the method further include identifying a plurality of joints corresponding to the intermediate mesh. Some examples further include generating a plurality of joint heatmaps for each of the plurality of joints. Some examples further include applying an activation function to the plurality of joint heatmaps to obtain joint coordinates for each of the plurality of joints, wherein the morphable model is generated based on the joint coordinates.

Some examples of the method further include generating truncation data and occlusion data for the parts of the body based on the image, wherein the visibility features are based on the truncation data and the occlusion data.

In some aspects, the morphable model includes pose parameters and shape parameters. In some aspects, the morphable model includes a body template, joint locations, pose parameters, and blend weights. In some aspects, the morphable model comprises a skinning function for generating the output mesh based on the parameters.

Some examples of the method further include identifying a visible portion of the intermediate mesh. Some examples further include identifying a portion of the output mesh corresponding to the visible portion of the intermediate mesh. Some examples further include optimizing the morphable model by comparing the visible portion of the intermediate mesh to the corresponding portion of the output mesh. Some examples of the method further include rendering an extended image depicting a portion of the body that is not depicted in the image based on the output mesh.

Figure 6:
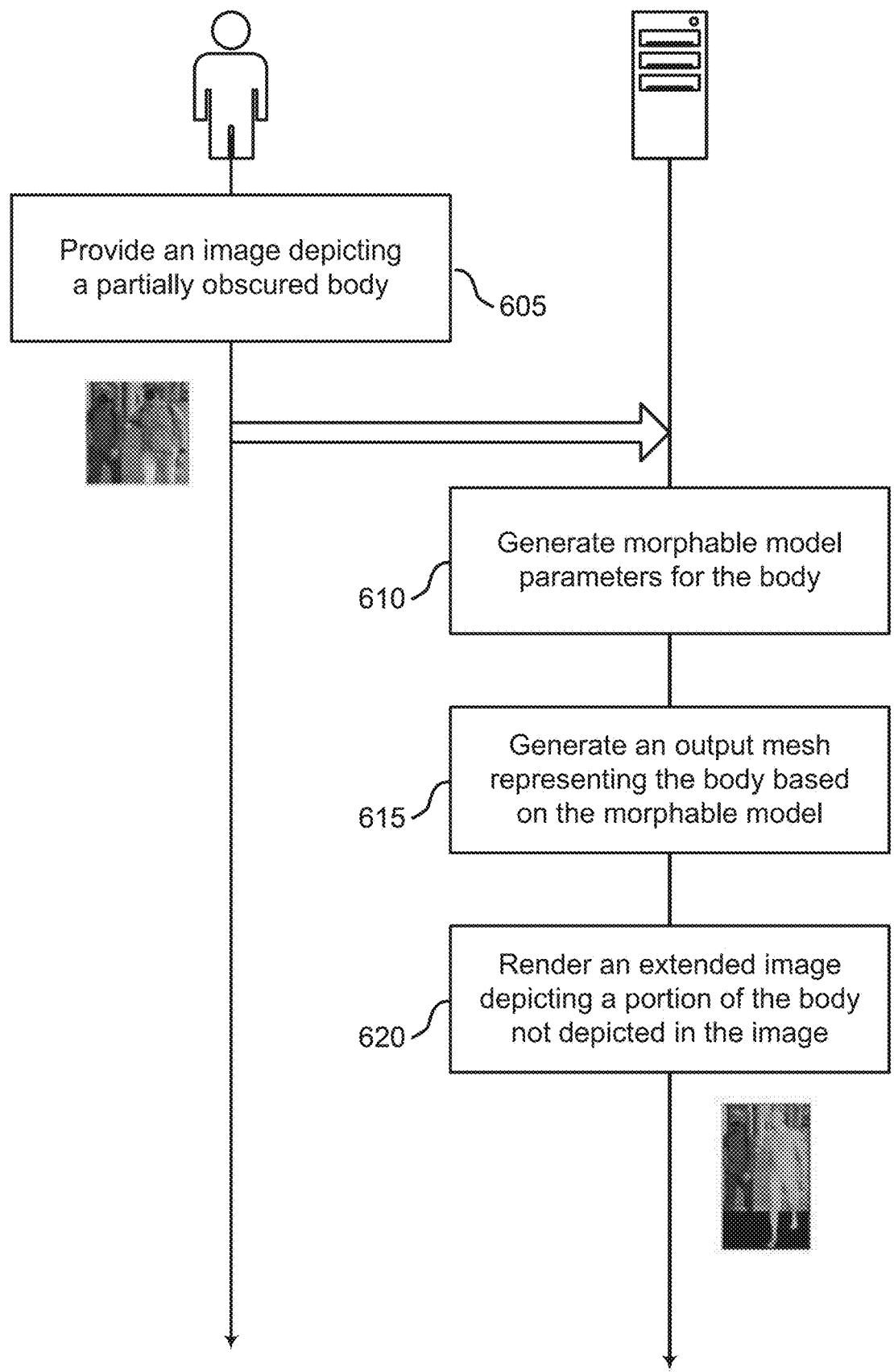
FIG. 6 shows an example of image rendering according to aspects of the present disclosure.

FIG. 6 shows an example of image rendering according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 6, in some embodiments, the system is used in an image rendering context. For example, the system generates an extended image (such as a three-dimensional model) of a body depicted in an image provided to the system by a user. In some embodiments, the extended image is rendered based on an output mesh that is generated based on visibility features computed by a machine learning model of the system. By generating the output mesh based on the visibility features, the extended image accurately depicts portions of the body that are not included in the image, whether by truncation or by occlusion.

At operation 605, a user provides an image depicting a partially obscured body. In an example, the body includes a portion of the body that is truncated (e.g., cut off by a boundary of the image in a horizontal or vertical direction) or occluded (e.g., blocked by another object depicted in the image, or blocked by another portion of the body). In some embodiments, the user provides the image by uploading the image to a mesh generation apparatus as described with reference to FIGS. 1 and 2. In some embodiments, the user uploads the image using a graphical user interface displayed on a user device by the mesh generation apparatus.

At operation 610, the system generates morphable model parameters for the body. In some cases, the operations of this step refer to, or may be performed by, a mesh generation apparatus as described with reference to FIGS. 1 and 2. In an example, the mesh generation apparatus generates the morphable model parameters as described with reference to FIGS. 7 and 8.

At operation 615, the system generates an output mesh representing the body based on the morphable model. In some cases, the operations of this step refer to, or may be performed by, a mesh generation apparatus as described with reference to FIGS. 1 and 2. In an example, the mesh generation apparatus generates the output mesh as described with reference to FIG. 7.

At operation 620, the system renders an extended image depicting a portion of the body not depicted in the image. In some cases, the operations of this step refer to, or may be performed by, a mesh generation apparatus as described with reference to FIGS. 1 and 2. In an example, the mesh generation apparatus renders the extended image as described with reference to FIG. 7.

Figure 7:
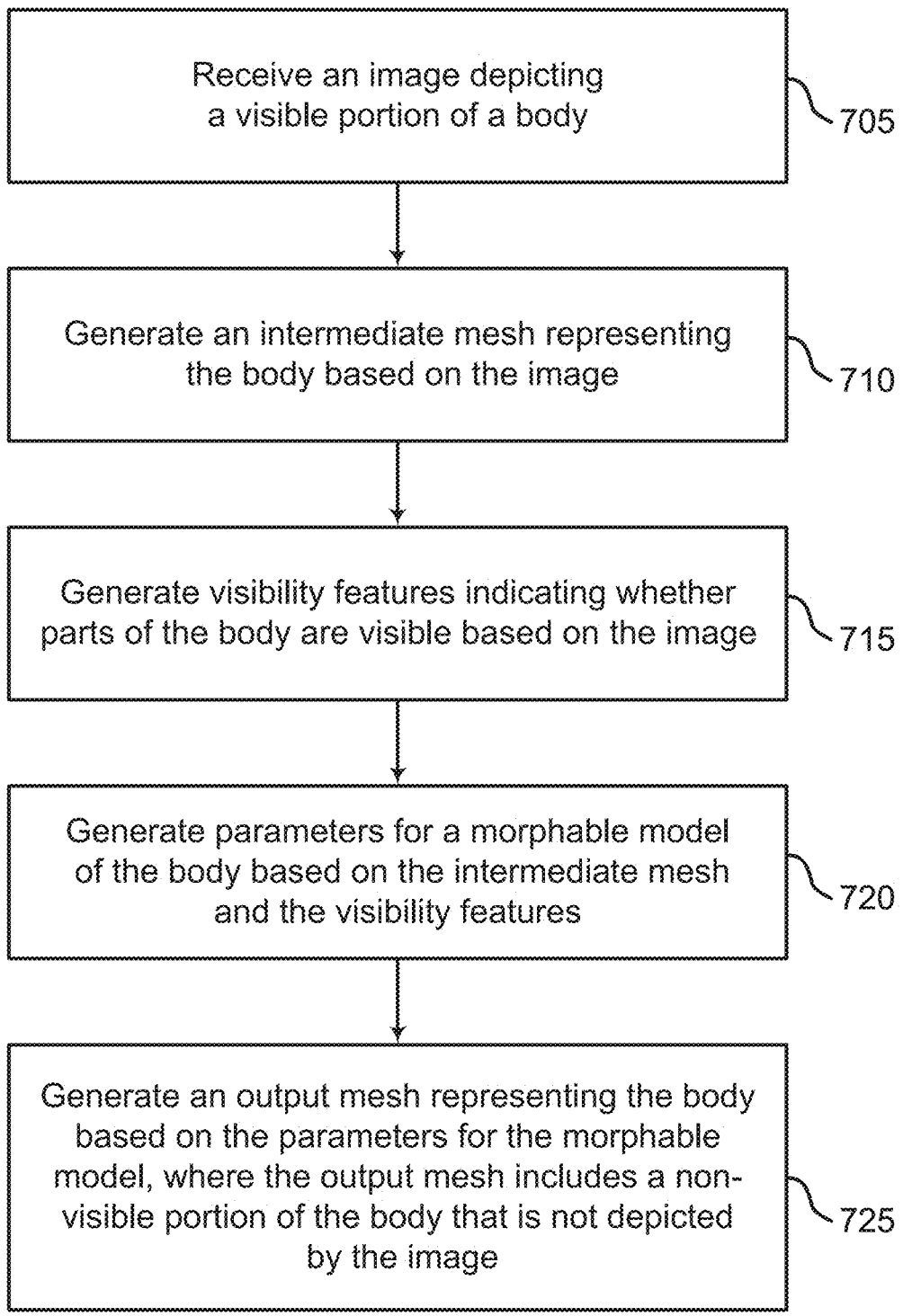
FIG. 7 shows an example of mesh generation according to aspects of the present disclosure.

FIG. 7 shows an example of mesh generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 7, the system receives an image depicting a visible portion of a body. Portions of the body may be truncated or occluded. The system generates an intermediate mesh for the body and visibility features indicating whether portions of the body are visible, generates a morphable model based on the intermediate mesh and the visibility features, and generates an output mesh using the morphable model. By generating the output mesh using the morphable model that is based on the visibility features, the output mesh includes accurate predictions of the pose and shape of portions of the body that are not depicted in the image, allowing a smooth and regular extended image corresponding to the body to be rendered based on the output mesh.

At operation 705, the system receives an image depicting a visible portion of a body. In some cases, the operations of this step refer to, or may be performed by, a mesh generation network as described with reference to FIGS. 2 and 4.

In some embodiments, a user uploads the image to the mesh generation network via a user device and a graphical user interface displayed by the mesh generation apparatus via he user device. In some embodiments, the mesh generation network retrieves the image from a database.

In some cases, the image is a two-dimensional image, having a width in a horizontal X-direction, a height in a vertical Y-direction that is orthogonal to the X-direction, and a depth perspective in a Z-direction orthogonal to both the X-direction and the Y-direction. In some cases, the image includes visible portions of the body, and the image omits non-visible portions of the body that the body may be expected to have. In some cases, the body is a human body. Examples of an image depicting a body are described with reference to FIGS. 1, 3, 6, and 10.

In some cases, the non-visible portions of the body are truncated. For example, truncated portions of the body are non-visible portions of the body that are separated from visible portions of the body by boundaries of the image in either the X-direction or the Y-direction.

In some cases, the non-visible portions of the body are occluded. In some cases, the occluded portions of the body are self-occluded, in that a visible portion of the body depicted in the image covers the non-visible portion of the body in terms of the Z-direction depth perspective. In an example, in an image depicting a body facing toward a viewer of the image, a front of the body may occlude at least a part of a back of the body. In some cases, the non-visible portions of the body are occluded by another object depicted in the image.

At operation 710, the system generates an intermediate mesh representing the body based on the image. In some cases, the operations of this step refer to, or may be performed by, a mesh generation network as described with reference to FIGS. 2 and 4.

In some cases, when the mesh generation network receives the image, the mesh generation network identifies a plurality of vertices of the intermediate mesh and generates a set of vertex heatmaps for each of the plurality of vertices. In some cases, when the mesh generation network receives the image, the mesh generation network identifies a plurality of joints of the intermediate mesh and generates a set of joint heatmaps for each of the plurality of vertices.

In an example, the mesh generation network estimates a set of heatmaps including a set of joint heatmaps $H_J^i$ and a set of vertex heatmaps $H_V^i$, where i indicates an x, y, and z dimension in the image. In some embodiments, the set of joint heatmaps includes three one-dimensional joint heatmaps (in the x, the y, and the z direction) for joints included in the body. In some embodiments, the set of vertex heatmaps includes three one-dimensional vertex heatmaps (in the x, the y, and the z direction) for mesh vertices included in the body. As used herein, a "heatmap" refers to a target representation of a body, where a value of a heatmap represents a prediction of an existence of a body joint or a mesh vertex at a corresponding pixel position of the input image and a discretized depth value corresponding to the image, thereby preserving a spatial relationship between pixels in the input image while modeling an uncertainty of the prediction.

In some embodiments, the joint heatmaps and vertex heatmaps in the x and Y-directions are defined in an image space corresponding to the image, and the joint heatmaps and vertex heatmaps in the Z-direction are defined in a depth space relative to a root joint (such as a pelvis joint) of the body. As used herein, a joint heatmap is denoted as $H_J^i \in \mathbb{R}^{N_J \times D \times 3}$ and a mesh vertex heatmap is denoted as $H_V^i \in \mathbb{R}^{N_V \times D \times 3}$, where $N_J$ is a number of joints in the body, $N_V$ is a number of vertices in the body, and D is given a heatmap resolution.

In some cases, the mesh generation network extracts image features $F \in \mathbb{R}^{c \times h \times w}$ from the image using a backbone network as described with reference to FIGS. 3 and 4. In some embodiments, the backbone network is a neural network that is pre-trained to perform feature extraction tasks. In some cases, the mesh generation network performs a convolution operation on the image features to obtain the set of heatmaps. In an example, the mesh generation estimates joint and vertex heatmaps along the X-axis $H^x$, joint and vertex heatmaps along the Y-axis $H^y$, and joint and vertex heatmaps along the Z-axis $H^z$ based on a 1×1 one-dimensional convolution $f^{1D,i}$ and the image features F:

$$H^x = f^{1D,x}(\mathrm{avg}^y(f^{up}(F))) \quad (1)$$

$$H^y = f^{1D,y}(\mathrm{avg}^x(f^{up}(F))) \quad (2)$$

$$H^z = f^{1D,z}(\psi(\mathrm{avg}^{x,y}(F))) \quad (3)$$

where $\mathrm{avg}^i$ is i-th axis marginalization by averaging, $f^{up}$ denotes up-sampling by deconvolution, and $\psi$ is a one-dimensional convolution layer followed by a reshaping operation.

In some embodiments, the mesh generation network applies an activation function to the set of vertex heatmaps to obtain vertex coordinates for each of the plurality of vertices. In an example, the mesh generation network obtains continuous three-dimensional joint coordinates $J \in \mathbb{R}^{N_J \times 3}$ and vertex coordinates $V \in \mathbb{R}^{N_V \times 3}$ of the body by applying an activation function on the set of joint heatmaps $H_J^i$ and the set of vertex heatmaps $H_V^i$, respectively. As used herein, an "activation function" refers to a function performed by each neuron of an artificial neural network on a weighted sum of the inputs to the neuron to produce an output. In some embodiments, the activation function is a SoftArgmax function.

In some embodiments, the intermediate mesh is based on the set of heatmaps. In an example, the intermediate mesh includes the vertex coordinates V. In an example, the intermediate mesh corresponds to the joint coordinates J.

At operation 715, the system generates visibility features indicating whether parts of the body are visible based on the image. In some cases, the operations of this step refer to, or may be performed by, a mesh generation network as described with reference to FIGS. 2 and 4.

In comparative examples, heatmap-based representations of bodies depicted in images are helpful in estimating shapes and poses of bodies in the image space, but do not accurately represent the body when the body is truncated or occluded, as a machine learning model that does not know which joints and vertices for a body are invisible may generate an erroneous output when it attempts to fit a model of the entire body, including the actually invisible portions. Accordingly, in some aspects, to effectively fit a model of a partially visible body depicted in an image, the mesh generation network augments the X-direction joint and vertex heatmaps with X-direction truncation data (e.g., binary truncation labels) $S^x$ and augments the Y-direction joint and vertex heatmaps with Y-direction truncation data $S^y$, where the truncation data indicates whether a given joint or a given vertex is truncated by a boundary of the image, and augments the Z-direction joint and vertex heatmaps with Z-direction occlusion data (e.g., binary occlusion labels) $S^z$, where the occlusion data indicates whether a given joint or a given vertex is occluded from the image.

In some embodiments, the mesh generation network performs a convolution operation on the image features F to generate the truncation data $S^x$ and $S^y$ and the occlusion data $S^z$ for the parts of the body based on the image:

$$S^x = \sigma(\text{avg}^x(g^{1D,x}(\text{avg}^y(f^{op}(F))))) \quad (4)$$

$$S^y = \sigma(\text{avg}^y(g^{1D,y}(\text{avg}^x(f^{op}(F))))) \quad (5)$$

$$S^z = \sigma(\text{avg}^z(g^{1D,x}(\psi(\text{avg}^{x,y}(F))))) \quad (6)$$

where $g^{1D}$ is a 1×1 one-dimensional convolutional layer similar to $f^{1D}$ and $\sigma$ is a sigmoid operator.

In some embodiments, the visibility features are based on the truncation data $S^x$ and $S^y$ and the occlusion data $S^z$. In an example, the mesh generation network concatenates the truncation data $S^x$ and $S^y$ the occlusion data $S^z$ to obtain joint visibility features $S_J \in \mathbb{R}^{N_J \times 3}$ and vertex visibility features $S_V \in \mathbb{R}^{N_V \times 3}$.

In some embodiments, the output of the mesh generation network includes the intermediate mesh (including the vertex coordinates V), the joint coordinates J corresponding to the intermediate mesh, the vertex visibility features $S_V$, and the joint visibility features $S_J$.

At operation 720, the system generates parameters for a morphable model of the body based on the intermediate mesh and the visibility features. In some cases, the operations of this step refer to, or may be performed by, a regression network as described with reference to FIGS. 2 and 5.

According to some aspects, a rendering component as described with reference to FIG. 2 may render a three-dimensional model of the body using the output of the mesh generation network. However, in some embodiments, the accuracy of a three dimensional model that is rendered using a mesh may be increased by rendering the three-dimensional model using an output mesh that is based on a morphable model generated by the regression network using the output of the mesh generation network. As used herein, a "morphable model" refers to parameters and functions for generating an output mesh.

Accordingly, in some embodiments, given the output of the mesh generation/network, the regression network generates pose parameters $\theta \in \mathbb{R}^{72}$ and shape parameters $\beta \in \mathbb{R}^{10}$ for the morphable model. In an example, the regression network passes the mesh generation network output through fully connected layers to obtain the shape parameters and performs a six-dimensional rotation to angle-axis rotation process to obtain the pose parameters.

In some embodiments, the morphable model is generated based on the joint coordinates. In an example, the regression network generates the morphable model such that the morphable model includes pose parameters generated based on the joint coordinates J.

In some embodiments, the morphable model includes a skinning function for generating the output mesh based on the parameters. In some embodiments, the morphable model includes a body template, joint locations, pose parameters, and blend weights. In an example, the skinning function $W(T, J, \theta, \mathcal{W}): \mathbb{R}^{3N \times 3K \times |\theta| \times |\mathcal{W}|} \mapsto \mathbb{R}^{3N}$ takes vertices in the rest pose (e.g., the body template) T, joint locations J, pose parameters $\theta$, and blend weights $\mathcal{W}$, and returns mesh coordinates MORPH($\beta,\theta$) and posed vertices for generating the output mesh.

According to some aspects, the morphable model includes the pose parameters and the shape parameters. In an example, the regression network generates the morphable model M according to:

$$M(\beta,\theta) = W(T_P(\beta,\theta), J(\beta), \theta, \mathcal{W}) \quad (7)$$

$$T_P(\beta,\theta) = T + B_S(\beta) + B_P(\theta) \quad (8)$$

where $B_S(\beta)$ and $B_P(\theta)$ are vectors of vertices representing offsets from the template T, and are referred to as shapes and pose blend shapes, respectively.

Conventional machine learning models regress a morphable model from each joint of a set of joints of a body depicted in an image, regardless of whether a joint of the set of joints is visible. In contrast, in some embodiments, the regression network generates the morphable model based on visibility data, and therefore fits the morphable model on visible joints only, thereby providing a more accurate morphable model for use in generating an output mesh.

At operation 725, the system generates an output mesh representing the body based on the parameters for the morphable model, where the output mesh includes a non-visible portion of the body that is not depicted by the image. In some cases, the operations of this step refer to, or may be performed by, a skinning component as described with reference to FIG. 2. In an example, the skinning component uses the mesh coordinates MORPH($\beta,\theta$) and the posed vertices provided by the skinning function of the morphable model to generate the output mesh that includes vertices and joints corresponding to the non-visible portion of the body. According to some aspects, as the output mesh is generated based upon a morphable model that is itself generated based upon visibility data, the output mesh more accurately predicts and incorporates the location of non-visible portions of a body than conventional machine learning models.

In some embodiments, a rendering component as described with reference to FIG. 2 receives the output mesh from the regression network and renders an extended image depicting a portion of the body that is not depicted in the image based on the output mesh. In an example, the extended image is a three-dimensional model of the body, and the rendering component renders the three-dimensional model of the body using a rendering engine included in the rendering component. In some embodiments, the rendering engine is a software component stored in memory, such as memory included in a memory unit as described with reference to FIG. 2.

According to some aspects, the rendering component displays an extended portion of the body that is not visible in the image based on the output mesh. For example, the rendering component generates the extended image including the extended portion of the body that is not visible in the image, and displays the extended image via a graphical user interface. In some embodiments, the mesh generation apparatus displays the graphical user interface via a user device. Examples of an extended image depicting an extended portion of the body are described with reference to FIGS. 1, 3, 5, and 9.

Figure 8:
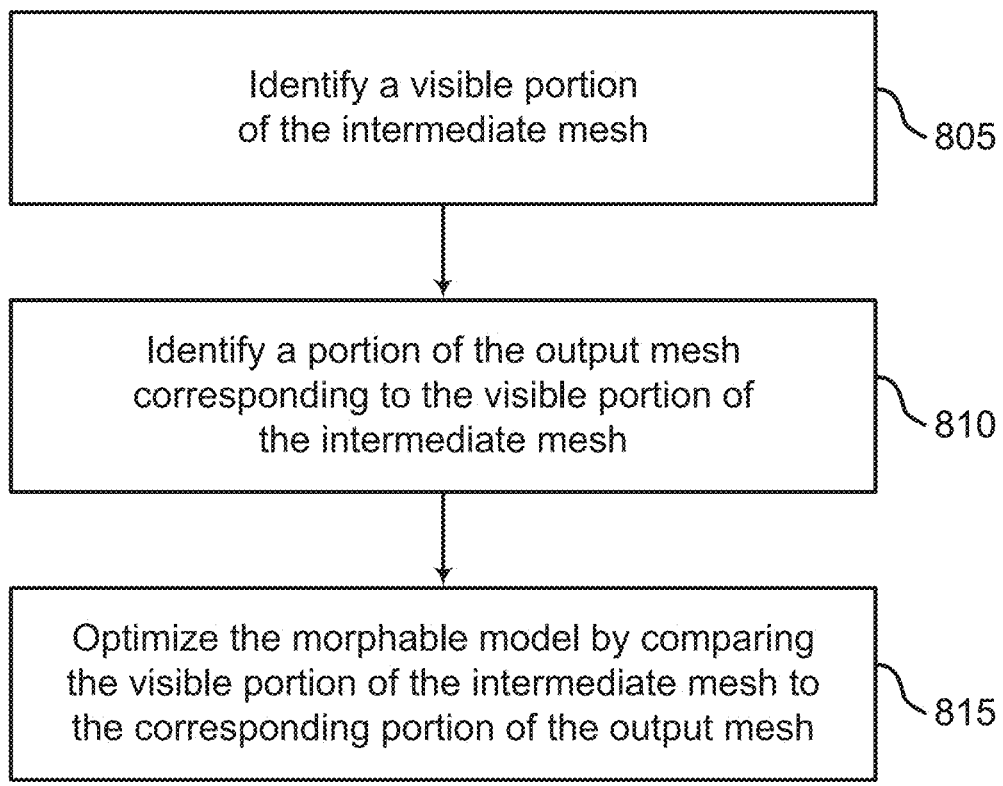
FIG. 8 shows an example of method morphable model optimization according to aspects of the present disclosure.

FIG. 8 shows an example of morphable model optimization according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Referring to FIG. 8, in some embodiments, an optimization component performs a test-time optimization of the morphable model to further promote shape and pose regularity and smoothness in an extended image generated based on the optimized morphable model.

At operation 805, the system identifies a visible portion of the intermediate mesh. In some cases, the operations of this step refer to, or may be performed by, an optimization network as described with reference to FIG. 2. In an example, the mesh generation network provides the output of the mesh generation network, including the intermediate mesh and the visibility features, to the optimization network, and the optimization network determines portions of the intermediate mesh that correspond to portions of the body that are visible in the image based on the visibility features.

At operation 810, the system identifies a portion of the output mesh corresponding to the visible portion of the intermediate mesh. In some cases, the operations of this step refer to, or may be performed by, an optimization network as described with reference to FIG. 2. In an example, the regression network provides the output mesh to the optimization component. The optimization network determines that a portion of the output mesh corresponds to a portion of the body that is visible in the image based on the visibility features.

At operation 815, the system optimizes the morphable model by comparing the visible portion of the intermediate mesh to the corresponding portion of the output mesh. In some cases, the operations of this step refer to, or may be performed by, an optimization network as described with reference to FIG. 2. In an example, the optimization network converts the vertex coordinates V and the joint coordinates J included in the mesh generation network output into root-relative coordinates in a camera space, V, and J, respectively. In some embodiments, the optimization component converts image space coordinates into the camera space using an estimated root joint depth, and subtracts a root joint coordinate (e.g., a pelvis coordinate) to obtain a root-relative mesh including the root-relative coordinates V, and J. In some embodiments, the optimization network compares the visible portion of the intermediate mesh to the corresponding portion of the output mesh using the root-relative mesh according to the following:

$$\mathcal{L}_{vert} = S_V \odot \|MORPH(\theta, \beta) - V_C\|_1 \quad (9)$$

$$\mathcal{L}_{joint} = S_J \odot \|RMORPH(\theta, \beta) - J_C\|_1 \quad (10)$$

$$\mathcal{L}_{prior} = \log\left(\sum_i^N G_i(\theta)\right) \quad (11)$$

where $\mathcal{L}_{MORPH\text{-}vert}$ is a vertex loss, $\mathcal{L}_{MORPH\text{-}joint}$ is a joint loss, $\odot$ denotes element-wise multiplication, $R \in \mathbb{R}^{N_v \times N_J}$ is a regressor function, $\mathcal{L}_{prior}$ is a pose loss using a Gaussian mixture model (GMM), and $G_i$ is the i-th component of the GMM. In some embodiments, the optimization network iteratively updates the parameters of the regression network at test time using $\mathcal{L}_{MORPH\text{-}vert}$, $\mathcal{L}_{MORPH\text{-}joint}$, and $\mathcal{L}_{prior}$ according to an Adam optimization algorithm to produce the optimized morphable model.

Figure 9:
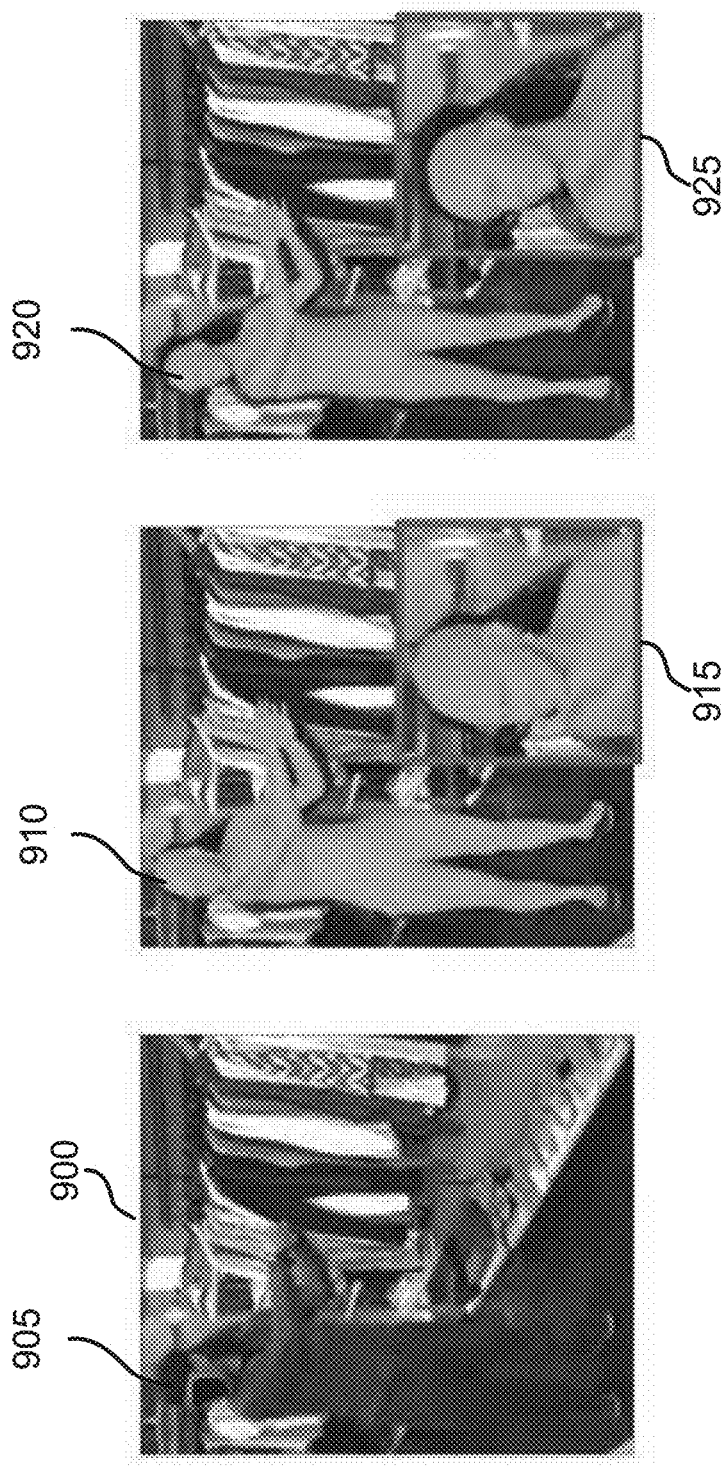
FIG. 9 shows an example of rendered images according to aspects of the present disclosure.

FIG. 9 shows an example of rendered images according to aspects of the present disclosure. The example shown includes image 900, first extended image 910, first detail view 915, second extended image 920, and second detail view 925. In one aspect, image 900 includes body 905.

Referring to FIG. 9, image 900 is an input image as described with reference to FIG. 3 that depicts body 905. Portions of body 905 are self-occluded by body 905 and are thus invisible. The mesh generation apparatus renders first extended image 910 based on an output of a mesh generation network as described with reference to FIG. 7. The mesh generation apparatus renders second extended image 920 based on an optimized morphable mesh as described with reference to FIGS. 7 and 8. As shown by FIG. 9, both first extended image 910 and second extended image 920 are three-dimensional models depicted as two-dimensional images overlaid on a copy of image 900. An increase in pose and shape regularity and smoothness in second extended image 920 from first extended image 910 is observed by comparing second detail view 925 of second extended image 920 with first detail view 915 of first extended image 910.

Training

A method for mesh generation is described with reference to FIGS. 10-11. One or more aspects of the method include receiving training data including an image of a body, a training mesh representing the body, and training visibility features; generating an intermediate mesh representing the body and visibility features indicating whether parts of the body are visible using a mesh generation network; and updating parameters of the mesh generation network based on the training mesh, the intermediate mesh, the visibility features, and the training visibility features.

Some examples of the method further include generating coordinates for a plurality of vertices of the intermediate mesh using the mesh generation network. Some examples further include computing a vertex loss by comparing the coordinates of the plurality of vertices for the intermediate mesh and coordinates of vertices of the training mesh, wherein the parameters of the mesh generation network are updated based on the vertex loss.

Some examples of the method further include generating coordinates for a plurality of joints corresponding to the intermediate mesh using the mesh generation network. Some examples further include computing a joint loss by comparing the coordinates for the plurality of joints corresponding to the intermediate mesh and coordinates of a plurality of joints corresponding to the training mesh, wherein the parameters of the mesh generation network are updated based on the joint loss.

Some examples of the method further include computing a visibility loss by comparing the visibility features and the training visibility features, wherein the parameters of the mesh generation network are updated based on the visibility loss.

Some examples of the method further include generating a UV map of the body. Some examples further include computing a UV correspondence loss based on the UV map and the visibility features, wherein the mesh generation network is updated based on the UV correspondence loss.

Some examples of the method further include receiving additional training data including an additional training mesh, additional training visibility features, and training parameters of a morphable model. Some examples further include predicting parameters for the morphable model using a regression network. Some examples further include updating parameters of the regression network based on the predicted parameters and the training parameters.

Some examples of the method further include generating an output mesh based on the parameters of the morphable model. Some examples further include computing a difference between the output mesh and the additional training mesh. Some examples further include weighting the difference based on the visibility features. Some examples further include computing a weighted vertex loss based on the weighted difference, wherein the regression network is updated based on the weighted vertex loss.

Figure 10:
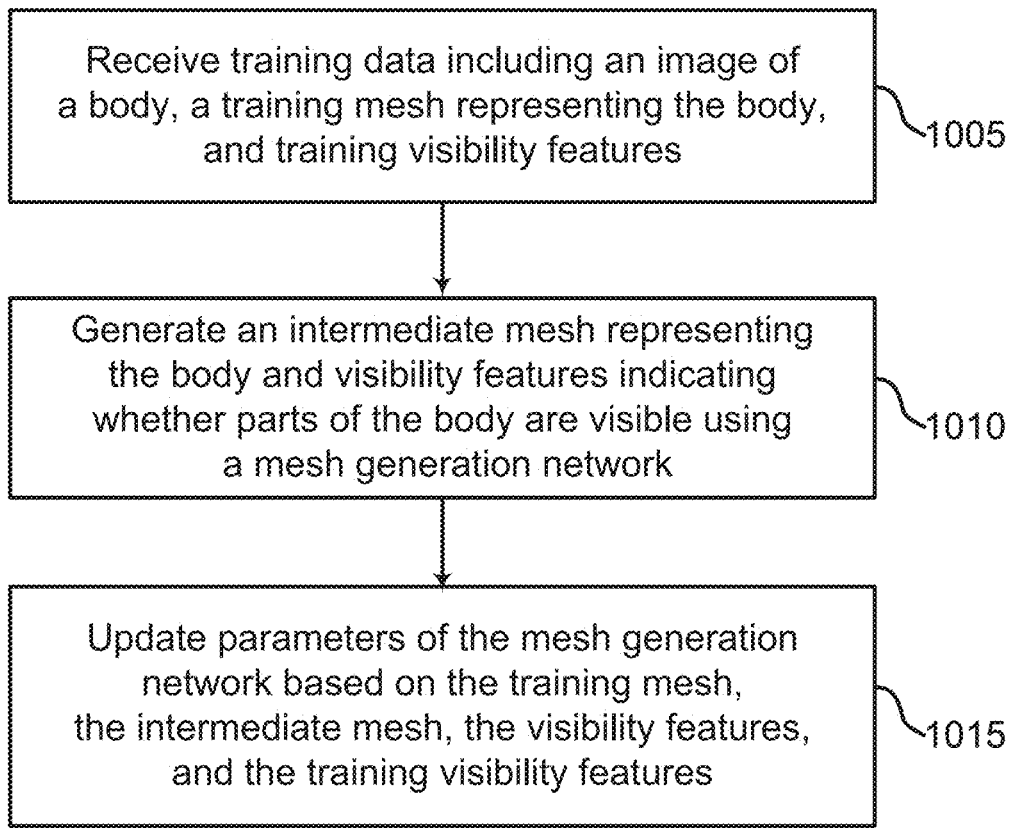
FIG. 10 shows an example of updating parameters of a mesh generation network according to aspects of the present disclosure.

FIG. 10 shows an example of updating parameters of a mesh generation network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system receives training data including an image of a body, a training mesh representing the body, and training visibility features. In some cases, the operations of this step refer to, or may be performed by, a training component as described with reference to FIG. 2.

In some embodiments, a user provides the training data to the training component via a graphical user interface displayed by the mesh generation apparatus via a user device. In some embodiments, the training component retrieves the training data from a database as described with reference to FIG. 2, or from another data store, such as one or more websites. In some embodiments, the training data includes ground-truth joint visibility features $S_J^*$ and ground-truth vertex visibility features $S_V^*$ (e.g., the training visibility features), and ground-truth joint coordinates J* corresponding to the training mesh, and the training mesh includes ground-truth vertex coordinates V*. In some embodiments, a training visibility feature is a concatenation of two or more ground-truth labels that indicate whether a portion of a body is truncated or occluded in a corresponding training image.

At operation 1010, the system generates an intermediate mesh representing the body and visibility features indicating whether parts of the body are visible using a mesh generation network. In some cases, the operations of this step refer to, or may be performed by, a mesh generation network as described with reference to FIG. 2. In an example, the mesh generation network generates the intermediate mesh, coordinates for a set of vertices of the intermediate mesh V, and coordinates for a set of joints corresponding to the intermediate mesh J as described with reference to FIG. 7.

At operation 1015, the system updates parameters of the mesh generation network based on the training mesh, the intermediate mesh, the visibility features, and the training visibility features. In some cases, the operations of this step refer to, or may be performed by, a training component as described with reference to FIG. 2.

According to some aspects, the training component updates the parameters of the mesh generation network using one or more losses derived from one or more loss functions. The term "loss function" refers to a function that impacts how a machine learning model is trained in a supervised learning model. Specifically, during each training iteration, the output of the model is compared to the known annotation information in the training data. The loss function provides a value (a "loss") for how close the predicted annotation data is to the actual annotation data. After computing the loss, the parameters of the model are updated accordingly and a new set of predictions are made during the next iteration.

In some embodiments, the training component computes a vertex loss $\mathcal{L}_{vert}$ by comparing the coordinates for the set of vertices of the intermediate mesh V and coordinates of vertices of the training mesh V* using a vertex loss function:

$$\mathcal{L}_{vert} = \|V - V^*\|_1 \quad (12)$$

where the training component updates the parameters of the mesh generation network based on the vertex loss $\mathcal{L}_{vert}$.

In some embodiments, the training component computes a joint loss $\mathcal{L}_{joint}$ by comparing the coordinates for the set of joints corresponding to the intermediate mesh J and coordinates of the set of joints corresponding to the training mesh J*:

$$\mathcal{L}_{joint} = \|J - J^*\|_1 \quad (13)$$

where the training component updates the parameters of the mesh generation network based on the joint loss $\mathcal{L}_{joint}$.

In some embodiments, the training component computes a visibility loss $\mathcal{L}_{vis}$ by comparing the visibility features $S_J$ and $S_V$ as described with reference to FIG. 7 with the ground-truth training visibility features $S_J^*$ and $S_V^*$ using a binary cross-entropy loss algorithm BCE:

$$\mathcal{L}_{vis} = BCE(S_J, S_J^*) + BCE(S_V, S_V^*) \quad (14)$$

where the training component updates the parameters of the mesh generation network based on the visibility loss $\mathcal{L}_{vis}$.

In some embodiments, the mesh generation network uses a regressor function $R \in \mathbb{R}^{N_V \times N_J}$ to regress the joint coordinates J from the vertex coordinates V. In some embodiments, the training component calculates a regressed-joint loss $\mathcal{L}_{r\text{-}joint}$:

$$\mathcal{L}_{r\text{-}joint} = \|RV - J^*\|_1 \quad (15)$$

where the training component updates the parameters of the mesh generation network based on the regressed-joint loss $\mathcal{L}_{Lr\text{-}joint}$.

In some embodiments, the training component updates the mesh generation network based on a UV map of the body. As used herein, the term "UV map" refers to a mapping of vertex information to two-dimensional coordinates, where the dimensions are represented as "U" and "V". In some embodiments, the training data is obtained from a set of images depicting bodies using a pseudo ground-truth algorithm, and the pseudo ground-truth algorithm might not be accurate with regard to images that depict only a portion of a body. Therefore, in some embodiments, to increase an accuracy of the training process for the mesh generation network, a dense UV correspondence between an input training image and an output mesh generated based on the training image is used.

According to some aspects, a dense UV estimation provides a part-based segmentation mask of a body depicted in a training image, as well as a UV map including continuous UV coordinates of each pixel of the training image corresponding to the body, where the UV map is robust to truncation and occlusions of the body in the training image.

In some embodiments, a UV component as described with reference to FIG. 2 generates a UV map of the body. In some embodiments, the training component instructs the UV component to generate the UV map after receiving the training data. According to some aspects, the UV component calculates a UV coordinate of each pixel corresponding to the body using a dense UV estimation algorithm. Then, for each pixel corresponding to the body p, the UV component determines a corresponding output mesh vertex v corresponding to a UV coordinate closest to the pixel p using a pixel-to-vertex mapping function $M_P$ and a vertex-to-pixel mapping function $M_V$:

$$M_P = \{p \rightarrow v | v = \mathrm{argmin}_{v'} \|UV(v') - UV(p)\|_2 \forall p\} \quad (16)$$

$$M_V = \{v \rightarrow \{p'\} | M(p') = v \forall v\} \quad (17)$$

In some embodiments, the UV component labels a vertex v that is mapped to at least one pixel p as visible or as occluded. In some embodiments, the UV component includes a weakly-supervised module based on the dense vertex-pixel correspondence for more accurate estimates.

In some embodiments, the training component computes a UV correspondence loss based on the UV map and the visibility features. In an example, for each vertex v, the UV component calculates a center of corresponding pixels $M_V(v)$ and the training component calculates a UV correspondence loss $\mathcal{L}_{uv}$ $$\mathcal{L}_{uv} = \sum_v s_v^z \left\| v^{x,y} - \sum_{p \in M_V(v)} \frac{p}{|M_V(v)|} \right\|_1 \quad (18)$$

where $v^{x,y}$ is a two-dimensional projection of vertex v and $s_v^z$ is a binary occlusion label, such that when $s_v^z = 1$, the vertex v is visible.

In some embodiments, the training component updates the parameters of the mesh generation network based on the UV correspondence loss $\mathcal{L}_{uv}$. For example, the UV correspondence loss $\mathcal{L}_{uv}$ not only mitigates inaccurate pseudo ground-truth meshes, but increases an accuracy with regards to bodies depicted in a training image, as the UV correspondence loss $\mathcal{L}_{uv}$ is determined based on segmentation mask predictions.

According to some aspects, the training component computes a normal loss $\mathcal{L}_{norm}$ based on a surface normal of the output mesh and an edge loss $\mathcal{L}_{edge}$ based on edge lengths of the output mesh:

$$\mathcal{L}_{norm} = \sum_f \sum_{\{v_1, v_j\} \subset f} \left| \left\langle \frac{v_i - v_j}{\|v_i - v_j\|_2}, n_f^* \right\rangle \right| \quad (19)$$

$$\mathcal{L}_{edge} = \sum_f \sum_{\{v_1, v_j\} \subset f} |\|v_i - v_j\|_2 - \|v_i^* - v_j^*\|_2| \quad (20)$$

where f is a mesh surface of the output mesh, $n_f$ is a unit normal vector off, and $v_i$ and $v^*$ are coordinates of vertices i and j, respectively.

In some embodiments, the training component updates the parameters of the mesh generation network based on the normal loss $\mathcal{L}_{norm}$ to promote shape regularization of the output mesh. In some embodiments, the training component updates the parameters of the mesh generation network based on the normal loss $\mathcal{L}_{edge}$ to promote shape regularization of the output mesh.

Figure 11:
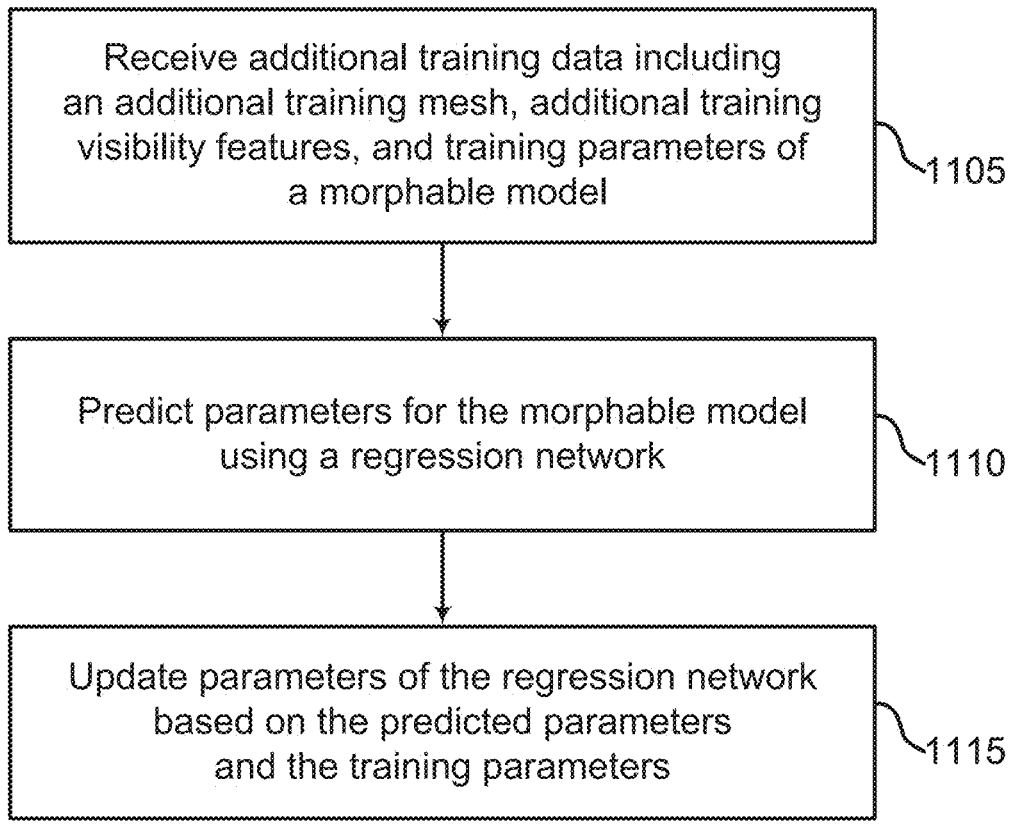
FIG. 11 shows an example of updating parameters of a regression network according to aspects of the present disclosure.

FIG. 11 shows an example of updating parameters of a regression network according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system receives additional training data including an additional training mesh, additional training visibility features, and training parameters of a morphable model. In some cases, the operations of this step refer to, or may be performed by, a training component as described with reference to FIG. 2.

In some embodiments, a user provides the additional training data to the training component via a graphical user interface displayed by the mesh generation apparatus via a user device. In some embodiments, the training component retrieves the additional training data from a database as described with reference to FIG. 2, or from another data store, such as one or more websites. In some embodiments, the additional training data includes an additional training mesh including additional ground-truth vertex coordinates $V_C^*$, and the training data further includes additional ground-truth joint coordinates $J_C^*$ corresponding to the additional training mesh, where c denotes root-relative coordinates in a camera space. In some embodiments, the additional training data includes training parameters including ground-truth pose parameters $\theta^*$ and ground-truth shape parameters $\beta^*$.

At operation 1110, the system predicts parameters for the morphable model using a regression network. In some cases, the operations of this step refer to, or may be performed by, a regression network as described with reference to FIG. 2. In an example, the regression network predicts the parameters for the morphable model by generating the parameters for the morphable model as described with reference to FIGS. 7 and 8.

In some embodiments, a skinning component as described with reference to FIG. 2 generates an output mesh based on the parameters of the morphable model as described with reference to FIG. 7.

At operation 1115, the system updates parameters of the regression network based on the predicted parameters and the training parameters. In some cases, the operations of this step refer to, or may be performed by, a training component as described with reference to FIG. 2. In an example, the training component computes a morphable model loss $\mathcal{L}_{MORPH}$:

$$\mathcal{L}_{MORPH} = \|\theta - \theta^*\|_1 + \|\beta - \beta^*\|_1 \quad (21)$$

where the training component updates the parameters of the regression network based on the morphable model loss $\mathcal{L}_{MORPH}$.

According to some aspects, the training component computes a difference between the output mesh and the additional training mesh, weights the difference based on the vertex visibility features $S_V$, and computes a weighted vertex loss $\mathcal{L}_{MORPH-vert}$ based on the weighted vertex difference:

$$\mathcal{L}_{MORPH-vert} = S_V \odot \|\mathrm{MORPH}(\theta, \beta) - V_c^*\|_1 \quad (22)$$

where $\mathrm{MGRPH}(\theta, \beta)$ are the coordinates corresponding to the morphable mesh and $\odot$ denotes element-wise multiplication. According to some aspects, the mesh generation network makes more confident predictions based on clearly visible vertices, and the vertex visibility features may be considered as prediction confidences that may be used to weigh the vertex loss.

In some embodiments, the training component updates the parameters of the regression network based on the weighted vertex loss.

According to some aspects, the training component computes a difference between joint coordinates corresponding to the output mesh J and the additional ground truth joint coordinates $J_C^*$, weights the difference based on the joint visibility features $S_J$, and computes a joint loss $\mathcal{L}_{MORPH\text{-}joint}$ based on the weighted joint difference:

$$\mathcal{L}_{MORPH\text{-}joint} = S_J \odot \|RMORPH(\theta,\beta) - J_c^*\|_1 \quad (23)$$

In some embodiments, the training component updates the parameters of the regression network based on the weighted joint loss. According to some aspects, the mesh generation network makes more confident predictions based on clearly visible joints, and the joint visibility features may be considered as prediction confidences that may be used to weigh the joint loss.

According to some aspects, the training component determines a pose prior loss $\mathcal{L}_{prior}$ using a fitted Gaussian mixture model (GMM):

$$\mathcal{L}_{prior} = \log\left(\sum_i^N G_i(\theta)\right) \quad (24)$$

where $G_i$ is the i-th component of the GMM. In some embodiments, the training component updates the parameters of the regression network based on the pose prior loss $\mathcal{L}_{prior}$.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for mesh generation, comprising:
receiving an image depicting a visible portion of a body;
generating an intermediate mesh representing the body based on the image;
generating, for a vertex of the intermediate mesh, a plurality of location heatmaps and a plurality of visibility features corresponding to a plurality of coordinate dimensions, respectively, wherein the plurality of visibility features indicate whether parts of the body are visible based on the image;
generating parameters for a morphable model of the body based on the intermediate mesh, the plurality of location heatmaps, and the plurality of visibility features; and
generating an output mesh representing the body based on the parameters for the morphable model, wherein the output mesh includes a non-visible portion of the body that is not depicted by the image.

2. The method of claim 1, further comprising:
displaying an extended portion of the body that is not visible in the image based on the output mesh.

3. The method of claim 1, further comprising:
extracting image features from the image, wherein the intermediate mesh and the plurality of visibility features are based on the image features.

4. The method of claim 1, further comprising:
identifying a plurality of vertices of the intermediate mesh;
generating a plurality of vertex heatmaps for each of the plurality of vertices; and
applying an activation function to the plurality of vertex heatmaps to obtain vertex coordinates for each of the plurality of vertices.

5. The method of claim 1, further comprising:
identifying a plurality of joints corresponding to the intermediate mesh;
generating a plurality of joint heatmaps for each of the plurality of joints; and
applying an activation function to the plurality of joint heatmaps to obtain joint coordinates for each of the plurality of joints, wherein the morphable model is generated based on the joint coordinates.

6. The method of claim 1, further comprising:
generating truncation data and occlusion data for the parts of the body based on the image, wherein the plurality of visibility features are based on the truncation data and the occlusion data.

7. The method of claim 1, wherein:
the morphable model includes pose parameters and shape parameters.

8. The method of claim 1, wherein:
the morphable model includes a body template, joint locations, pose parameters, and blend weights.

9. The method of claim 1, wherein:
the morphable model comprises a skinning function for generating the output mesh based on the parameters.

10. The method of claim 1, further comprising:
identifying a visible portion of the intermediate mesh;
identifying a portion of the output mesh corresponding to the visible portion of the intermediate mesh; and
optimizing the morphable model by comparing the visible portion of the intermediate mesh to the corresponding portion of the output mesh.

11. The method of claim 1, further comprising:
rendering an extended image depicting a portion of the body that is not depicted in the image based on the output mesh.

12. A method for mesh generation, comprising:
receiving training data including an image of a body, a training mesh representing the body, and training visibility features;
generating, using a mesh generation network, an intermediate mesh representing the body and, for a vertex of the intermediate mesh, a plurality of location heatmaps and a plurality of visibility features corresponding to a plurality of coordinate dimensions, respectively, wherein the plurality of visibility features indicate whether parts of the body are visible; and
updating parameters of the mesh generation network based on the training mesh, the intermediate mesh, the plurality of location heatmaps, the plurality of visibility features, and the training visibility features.

13. The method of claim 12, further comprising:
generating coordinates for a plurality of vertices of the intermediate mesh using the mesh generation network; and
computing a vertex loss by comparing the coordinates for the plurality of vertices of the intermediate mesh and coordinates of vertices of the training mesh, wherein the parameters of the mesh generation network are updated based on the vertex loss.

14. The method of claim 12, further comprising:
generating coordinates for a plurality of joints corresponding to the intermediate mesh using the mesh generation network; and computing a joint loss by comparing the coordinates for the plurality of joints corresponding to the intermediate mesh and coordinates of a plurality of joints corresponding to the training mesh, wherein the parameters of the mesh generation network are updated based on the joint loss.

15. The method of claim 12, further comprising:
computing a visibility loss by comparing the plurality of visibility features and the training visibility features, wherein the parameters of the mesh generation network are updated based on the visibility loss.

16. The method of claim 12, further comprising:
generating a UV map of the body; and
computing a UV correspondence loss based on the UV map and the plurality of visibility features, wherein the mesh generation network is updated based on the UV correspondence loss.

17. The method of claim 12, further comprising:
receiving additional training data including an additional training mesh, additional training visibility features, and training parameters of a morphable model;
predicting parameters for the morphable model using a regression network; and
updating parameters of the regression network based on the predicted parameters and the training parameters.

18. The method of claim 17, further comprising:
generating an output mesh based on the parameters of the morphable model;
computing a difference between the output mesh and the additional training mesh;
weighting the difference based on the plurality of visibility features; and
computing a weighted vertex loss based on the weighted difference, wherein the regression network is updated based on the weighted vertex loss.

19. An apparatus for mesh generation, comprising:
a mesh generation network configured to generate an intermediate mesh representing a body depicted in an image and, for a vertex of the intermediate mesh, a plurality of location heatmaps and a plurality of visibility features corresponding to a plurality of coordinate dimensions, respectively, wherein the plurality of visibility features indicate whether parts of the body are visible;
a regression network configured to generate parameters for a morphable model of the body based on the intermediate mesh, the plurality of location heatmaps, and the plurality of visibility features; and
a skinning component configured to generate an output mesh representing the body by applying the morphable model based on the parameters.

20. The apparatus of claim 19, further comprising:
a UV component configured to generate a dense UV map of a body, wherein the regression network is trained based on the dense UV map.

* * * * *